(12) United States Patent
Rojas

(10) Patent No.: US 6,473,504 B2
(45) Date of Patent: Oct. 29, 2002

(54) TELEMANAGEMENT SYSTEM WITH SINGLE POINT OF ENTRY

(75) Inventor: Michael J. Rojas, North Canton, OH (US)

(73) Assignee: NEC America, Inc., Melville, NY (US)

( * ) Notice: Subject to any disclaimer, the term of this patent is extended or adjusted under 35 U.S.C. 154(b) by 0 days.

(21) Appl. No.: 09/963,944

(22) Filed: Sep. 24, 2001

(65) Prior Publication Data

US 2002/0080945 A1 Jun. 27, 2002

Related U.S. Application Data

(62) Division of application No. 09/183,407, filed on Oct. 30, 1998, now Pat. No. 6,411,700.

(51) Int. Cl.[7] .................................................. H04M 7/00
(52) U.S. Cl. .................. 379/229; 379/219; 379/221.02
(58) Field of Search ................................. 379/229, 219, 379/220.01, 221.02, 221.15, 225, 230, 242, 201.05, 201.03, 201.01

(56) References Cited

U.S. PATENT DOCUMENTS

| | | | |
|---|---|---|---|
| 4,928,304 A | 5/1990 | Sakai | 379/93.14 |
| 5,261,061 A | 11/1993 | Ju | 379/27.07 |
| 5,276,727 A | 1/1994 | Kim et al. | 379/27.07 |
| 5,309,509 A | 5/1994 | Cocklin et al. | 379/165 |
| 5,333,183 A * | 7/1994 | Herbert | 379/112.01 |
| 5,341,498 A | 8/1994 | Connor et al. | 707/104.1 |
| 5,463,682 A * | 10/1995 | Fisher et al. | 379/230 |
| 5,187,787 A | 5/1996 | Skeen et al. | 709/314 |
| 5,546,580 A | 8/1996 | Seliger et al. | 707/8 |
| 5,761,432 A | 6/1998 | Bergolm et al. | 709/226 |
| 5,875,242 A * | 2/1999 | Glaser et al. | 379/88.17 |
| 5,926,530 A | 7/1999 | Schlossman et al. | 379/117 |
| 5,953,389 A * | 9/1999 | Pruett et al. | 379/15.02 |
| 6,366,919 B2 * | 4/2002 | O'Kane et al. | 379/201.05 |

* cited by examiner

Primary Examiner—Fan Tsang
Assistant Examiner—Ovidio Escalante
(74) Attorney, Agent, or Firm—Scully, Scott, Murphy & Presser

(57) ABSTRACT

A telecommunication management system drawn to configuring a Service Provider telemanagement program module by a client application, where the Service Provider supports multiple systems, the method steps comprise sending a request for Service Provider version information from the client application to a Service Provider; sending version information back to the client application from the Service Provider indicating a multiple system support; sending a request to identify system support from the client application to the Service Provider; sending a list of all supported systems back to the client application from the Service Provider; selecting a system for configuration; sending a request for selected system version information from the client application to the selected Service Provider; sending back system version information from the selected Service Provider to the client application; sending a request for all supported properties for the selected system from the client application to the Service Provider; sending back a list of all supported properties for the selected system from the Service Provider to the client application; and selecting one or more supported properties for management by the Service Provider.

1 Claim, 14 Drawing Sheets

TELEMANAGEMENT SYSTEM WITH SINGLE POINT OF ENTRY

CROSS REFERENCE TO RELATED APPLICATION

The present application is a divisional of application Ser. No. 09/183,407 filed on Oct. 30, 1998 now U.S. Pat. No. 6,411,700.

BACKGROUND OF THE INVENTION

1. Field of the Invention

This invention is directed to a telecommunications management system and more particularly to a telemanagement system having single point of entry and synchronized database features.

2. Description of the Prior Art

As technology continues to march forward year after year, the telecommunications professional is faced with an ever increasingly complex task of dealing with these systems. In the early days (circa 1982–85), a corporation's telecommunications infrastructure typically consisted of only a single phone system using a single Public Broadcast Exchange (PBX). When a new employee came aboard, maintenance on this system was relatively simple—a few commands was all that was required to add a new phone.

However, as corporations grew, so did their phone systems. Soon, companies had multiple systems scattered among several sites. When an employee moved from one site to another more commands were needed to accomplish this task—a "delete" on the old system and an "add" on the new system.

Telecommunication professionals invented new ways in dealing with these changes. By using change requisition forms and control sheets, the work could be managed and processed in bulk—all manually. This technique worked—for a while.

For years, the only way to get reports on a corporation's phone activity was to wait for the bill from the phone company. However, soon the owners of these systems realized they too could track phone activity by using special data ports in the PBX. These ports became known as Station Message Detail Records or SMDR. The concept was simple—every time a phone call was completed, the PBX would transmit a single SMDR data packet. These data packets could be collected, stored on a computer, and detailed reports could be generated. A new system known as Call Accounting was introduced to meet this requirement.

However, Call Accounting systems also required their own data management. When a new employee came aboard, the telecommunications professional had to add a data record into the Phone System and into the Call Accounting system as well. When an employee moved, multiple records and multiple systems needed updating. But technology did not stop there. Soon corporations began replacing individual telephone answering devices with more economical Voice Mail Systems (VMS). These systems could literally replace thousands of individual answering devices with a single machine. However, these systems needed data management as well. With the introduction of Computer-Based Phone Directories, Human Resource Systems, Credit Card/Authorization Code Systems, Emergency 911 Systems, Service Billing Systems, Network Access Devices, and many others, the telecommunications professional was soon faced with updating as many as 10 (or more) separate systems with the exact same information. Even with forms and procedures, this task was difficult at best and very error prone. obviously, a better method was needed.

The professional had to wait until the early 90's before solutions were attempted to address this problem. The first attempt at solving this problem was known as product integration. The concept was simple, a telecommunications vendor would produce a product that would combine all of the needed features into a single package. By having all of the telecommunication systems in a single platform, software could be engineered to share a single database. This would allow a single data management screen to be presented to the telecommunication professional. From this screen, all products could be updated at once. Soon, products began appearing on the market that were Call Accounting+Voice Mail+Phone Directory (or the like) all in one software package. North Coast Logic produced two generations of such packages (VSX and ARENIX). These packages worked in many environments and are still in use today.

However, they didn't work in all situations. One problem was many corporations wanted multi-vendor solutions. The telecommunications' professional did not want to be dependent on single vendor for the entire communications infrastructure. They wanted to shop and get the best value. They also soon realized that a single vendor could not be an expert in every industry.

Another problem was that these integrated products typically consisted of a single hardware platform. All applications ran on a single machine. If that machine failed, the entire infrastructure was brought down. Even though many vendors tried to compensate for this by using highly reliable (and redundant) equipment, the solution still fell short of relieving the mounting workload on the professional.

The problem with a single database design became evident by the database technology itself. No single database technology fills every application requirement. Each vendor makes database technology decisions based on their unique system framework. For example, a Call Accounting system may be able to use any off the shelf Database Management System (DBMS), but a Voice Mail System needs a specialized data streaming system that is able to store and retrieve recorded voice data at 4–8 kb per second. A Phone System database is usually completely stored in memory and made up of a series of jump tables organized in a tree-like fashion. This allows the system to traverse the database as each digit is dialed. No off the shelf database product would fit all of these unique requirements.

In addition to the problems described above, an even worse issue exists with these early integrated systems. In a typical telecommunications environment, each of these systems have their own data entry terminal. This means that if the telecommunications professional does not use the integrated data management screen to do updates, the various databases in each system will become out-of-sync with each other. This is known as the multiple-entry problem.

For example, suppose that the telecommunications professional updates the phone system via its own data entry terminal, but updates the Call Accounting and Phone Directory via the integrated data management screen. In this scenario, it is possible that the changes made directly to the PBX may be lost or be left different than those in the integrated product. The two databases are out-of-sync.

Although it is tempting to mandate that all data entry is done via the integrated screen, in practice this is seldom the case. In many situations, work is required to be performed on a specific system and may require the use of a special field not accessible via the integrated screen. Even if all features could be moved to the integrated data management screen, the user interface would be so unwieldy that no user could navigate it.

SUMMARY OF THE INVENTION

The solution to this problem is a new telecommunications management system that deploys a unique Single-Point-of-Entry and Synchronous Data Base system that addresses the shortcomings of the prior art.

The system of the present invention is an integrated suite of system control and application software modules used to manage one or more telephone systems. In addition to controlling commonly used PBX systems, the invention controls adjunct systems such as voice mail and 911 emergency systems. The system of the invention ties its application modules and system control modules together through a single point of entry and a synchronized database. Information entered through one module is automatically accessible by all other modules. Details of the various application modules are described in more detail in copending U.S. patent application Ser. No. 09/183,414, filed Oct. 30, 1998 by the same inventor and assigned to the same assignee as the present application, the entire application of which is hereby incorporated by reference herein.

Repeated data entry and multiple system management are eliminated for client application such as call accounting, cabling, assets, work orders, trouble tickets, traffic analysis, authorization codes, bill reconciliation, billing and other applications. The system ties its modules together across a LAN or operates as a stand-alone system. Operators can use networked computers for number lookup on its interactive directory or for information distribution via its message center.

The telemanagement system of the present invention is created around several concepts. First, modules are easily added to suit a company's growing needs. As technology advances, the system provides seamless integration between the PBX, the voice mail, and each existing, or Suture module.

Second, the system easily synchronizes several databases, allowing them to operate as one. It is impractical to manage multiple applications and devices with a single database. Technicians are comfortable with PBX and voice mail programming. Requiring them to relearn system programming through a new interface can jeopardize system stability. The system of the present invention reaches out to the PBX and the voice mail databases and adjusts them by reading from or writing to them. Users can synchronize records one at a time or all together. A reconciliation feature compares databases and makes changes where deemed appropriate.

The modular design and database synchronization establish the foundation for the system design of Single Point of Entry (SPE). Single point of entry eliminates the need to actively manage multiple systems. Instead of entering changes into each telemanagement application, information is shared between the modules and automatically updated with each move, add, or change. Default information can often be used to fill in fields and further reduce entry time.

Single point of entry is how the present invention distributes data entered in one module to all other modules. The system communicates to its application modules, the PBX system, the voice mail and other adjunct systems via communication links, then translates or transfers the data so that it can be used as necessary.

The modules that control the PBX and the adjunct systems are referred to as SPEs. Using a PBX SPE, a user can make PBX moves, adds, and changes then quickly move to an application such as call accounting. Any change made in one module can immediately be learned by the others. This makes adding a new user as easy as making a few mouse clicks.

Using a combination of system control and application modules, the user can add a station, commit inventory, execute system programming commands, reserve cable pairs, update directory information, determine associated costs, and bill accounts-all through a single user interface.

SPEs address the many databases maintained by a telecommunication-department. In addition to supporting the PBX and network hardware, it is common for an administrator to have to modify or update multiple files, systems, databases, and records. These updates may include PBX maintenance, voice mail administration, and emergency 911 demographics.

In the telemanagement system of the present invention, a Client Application can request a service to be performed by a Service Provider. A Client Application is a telemanagement application program providing management features such as Call Accounting, Cable Plant Tracking, etc. A Service Provider is software program that allows management of the PBX telephone system and adjunct systems such as a voice mail and 911 emergency systems.

The problem in the telecommunications world is that no single data management standard exists which would allow one to write a single, generic Service Provider. Previously each Service Provider had to be designed to interact with each system differently. However, all Service Providers had to provide the appearance of having homogeneous data representation across all systems.

To accomplish this "illusion", the telemanagement system of the present invention represents a specific data field on a specific system as a unique property. A property has the following attributes:

Human-readable name—used for identifying this property to the user.

Field name—suitable for database use and SQL syntax.

Read/Write Access flags—used to indicate whether this system supports modifications to this field. Valid selections are read-only, write-only, read-write.

Length—used to limit data entry to this property.

Category—used for placing properties into groups for easier management.

Default Value—a specially encoded string that allows the Service Provider to extract data from other parts of the telemanagement system.

By using this property technique, the Service Provider assumes the role of a translator. It converts the homogeneous data view into system specific information and visa-versa.

In addition to abstracting the individual properties, the number and type of properties are abstracted as well. This abstraction allows the client software in the telemanagement system to interrogate the Service Provider for the supported properties. This interrogation is handled by a protocol known as SPE configuration. When the telemanagement system software is first installed, the user can use system setup features to configure each SPE, and customize each one for their use. This allows the user to manage just the properties that are important to a particular installation and not the entire property set for all installed Service Providers. Thus, the skill level of the end-user, not the software developer, determines the complexity of the user-interface.

The SPE Configuration protocol uses a series of info data packets to accomplish the interrogation.

Once the Service Provider sends a list of all supported properties, the Client software can display a configuration dialog. This dialog allows the user to configure the properties to be managed. When the user has included/excluded the desired properties, a Create Table button is pressed. This instructs the telemanagement system to use the selected property fields to build a master database table. This table contains a master copy of the data in the PBX or adjunct system in its "homogeneous" form. This allows the data to be shared with other PBX or adjunct systems.

Since the end-user has control over which properties of each system are to be managed, the system provides for the dynamic generation of the user interfaces. In addition, the user-interface supports data sharing among systems.

The interface was split into two sections, a user-record selection part, and a Service Provider access part. A list of all managed users is displayed on the left-hand side, while a tab is displayed on the right-hand side for each Service Provider active in the system This design maintains the appearance of one master user database, which could access any Service Provider in the system. In addition, when a new Service Provider is added into the environment, only a new tab appears. No data has to be copied, or tables have to be converted to maintain this single database appearance. To access a particular Service Provider, the end-user need only select the appropriate user record, and click on the tab of the system that needs to be managed.

If the end-user has not configured any properties for a particular system, then its corresponding tab is not displayed. Thus the complexity of the user-interface can be managed—unnecessary fields are effectively hidden.

The end-user has a convenient interface in which to control the Master Database and interact with the PBX and adjunct systems. In addition, this design allows the user to build-up the master database offline from the these systems.

Having separate control of the master data base and the Service Provider is an important aspect of the system in providing efficient data management.

Of course, having two independent controls allows for possible database synchronization problems. This especially becomes evident when you add a PBX Maintenance terminal. Data entered by the PBX Maintenance Terminal will not be automatically entered into the Master Database. In addition, it is possible to enter data into the Master Database without sending the changes to the PBX or adjunct systems. This is called delayed update. If either of these conditions exist, the master database is out-of-sync with the these systems.

To overcome this problem, the telemanagement system of the present invention deploys the Service Provider control called Learn. This control allows the end-user to perform a one-record synchronization between the Master Database and the PBX and adjunct systems.

By using the Learn control, the end-user can immediately query the PBX or adjunct system for any changes that were made outside the telemanagement system. In fact, the end-user can check these systems to see if the record even exists at all. If is does, all data regarding this user is retrieved and inserted into the Master Database thus eliminating any data entry. Since the synchronization is for only the selected user record, synchronization occurs in real-time and is typically 1–2 seconds.

By using the Learn Control, Single-Point-of-Entry can be maintained regardless of the existence of multiple databases, and multiple data entry terminals (multiple-points-of-entry).

In addition, Learn can be deployed across all records in the master database and all records in the PBX and adjunct systems. We call this global synchronization. By using global synchronization, the end-user can quickly populate the master database from the these systems, or update the systems with records that were entered offline.

The telemanagement system of the present invention includes an underlying technology providing interprocess communication, called ARENA. The Arena is a real-time messaging system in which all of the various software modules in the telemanagement system can interact.

The request is sent to the Arena and is dispatched to the appropriate Service Provider. The Service Provider performs the request and sends the response back to the Client Application. The return trip of the request is typically a few seconds.

All the software in the telemanagement system communicates in this manner. Each message sent through the Arena is referred to as an event. The data contained in each message is typically human-readable text. A method of encoding data into human-readable strings that are prepared for transmission is used. When received, the strings are decoded back into application specific data structures and processed. Since each packet is encoded/decoded in this manner, Arena messages are able to traverse various operating systems and heterogeneous networking environments.

The telemanagement system can have many Service Providers, so the system requires a routing/group provider technology in the Arena. This would allow many telemanagement systems to talk to many Service Provider Modules.

To accomplish this, the present system deploys a method of subscribing/unsubscribing to particular Arena events. Every message sent through the Arena contains a 4-character event name. When a Service Provider initializes, it makes itself known to the Arena by connecting and subscribing to a particular event by using the event name.

This mechanism provides the means of routing an event through the Arena system to a particular Service Provider. But this routing has important side benefit: all Client requests for a particular Service Provider can be grouped together.

Grouping provides traffic efficiency but requires another mechanism in the Arena environment—Peer-to-Peer messaging. If two clients are requesting a service to be performed from the same Service Provider, the Service Provider receives both message packets and can perform the work efficiently (i.e. bulk the requests). However, the results of each request must be sent back only to each requester. To accomplish this the present system deploys a modified RPC (remote procedure call). A request could be received in a broadcast scenario but responded to individually by the Service Provider.

DETAILED DESCRIPTION OF THE INVENTION

Figure 1:
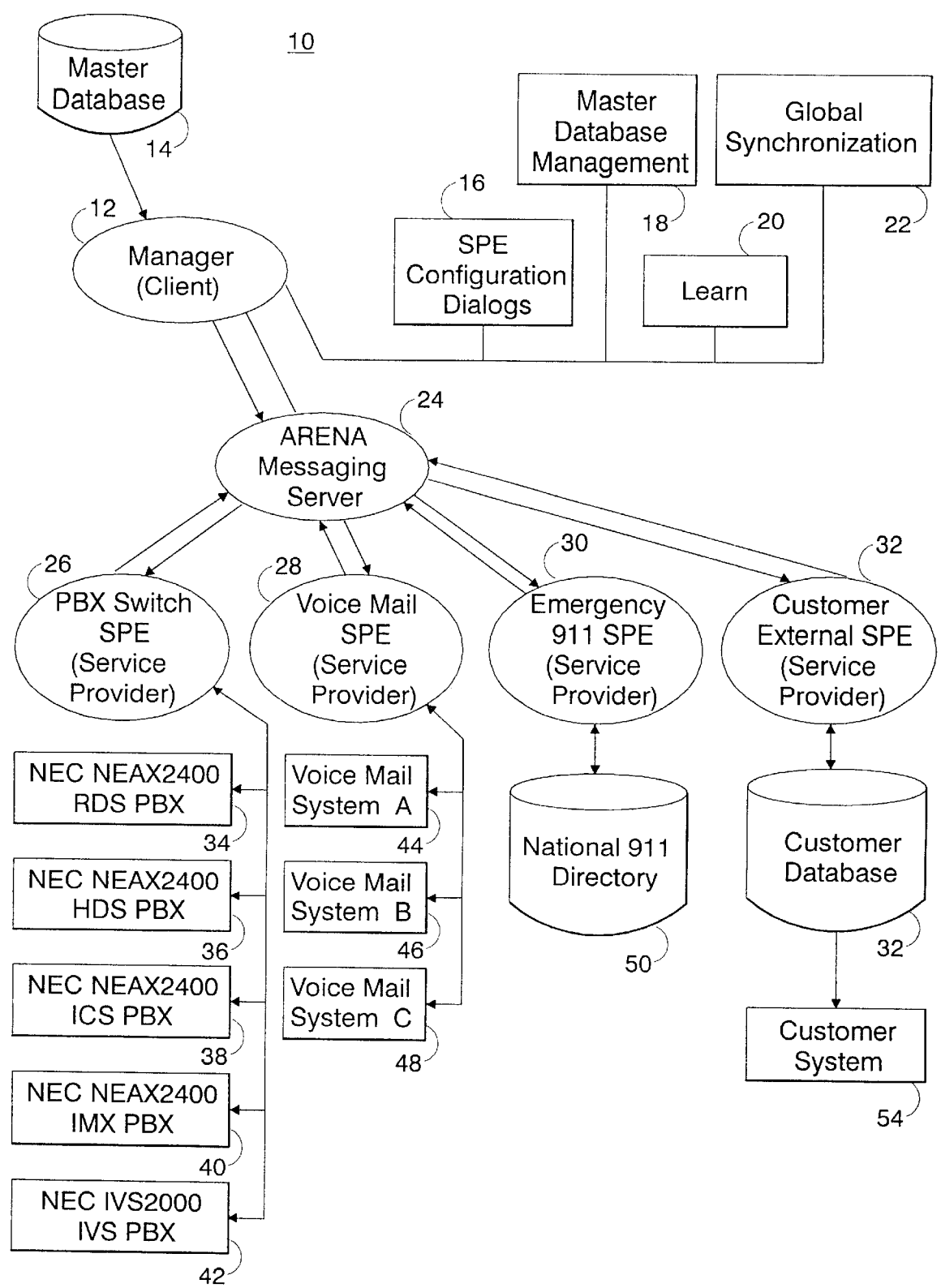
FIG. 1 is a block diagram showing the components of the telemanagement system of the present invention.

The telemanagement system with single point of entry (SPE) of the present invention is diagrammatically shown in FIG. 1. The system 10 includes a system manager program 12 that consists of an interface management program and several client application programs such as call accounting, cable tracking, billing, etc. Data entered into system through the manager program 12 is stored in a master database 14. The system manager has many components providing typical telemanagement features that can be managed from a stand-alone or networked computer. In addition, the manager 12 contains certain features for implementing the SPE capability. These SPE features are: SPE configuration dialogs module 16, master database management module 18; learn module 20 and global synchronization module 22. These modules work together to provide the overall effect of single point of entry. An interprocess communication module shown as ARENA messaging server 24 is provided to control the interaction between the manager 12 and a plurality of service provider modules. In the illustrative embodiment of FIG. 1, the service provider modules are a PBX SPE 26, Voice Mail SPE 28, Emergency 911 SPE 30 and Customer External SPE 32.

The service provider modules can be connected to one or more of the corresponding telecommunications devices. For example, Module 26 is connected to five PBX systems 34–42. Each system includes a PBX switch and database. In the illustrated embodiment, each of the PBX system is a different system manufactured by NEC. The systems could also be made by various manufacturers. Similarly, module 28 is connected to three different voice mail systems 44–48. A multiple system service provider enables the development of consolidated translation logic for tasks common to the multiple systems.

PBX SPE 26 manages the most often used PBX Maintenance and Administration Terminal (MAT) functions. This control module provides a single point of entry between database 14 and PBX systems 34–42. A PBX viewing screen provides a graphical user interface (GUI) of the switch, allowing the user to view a graphic of the PBX from anywhere on the network. The graphic displays line and trunk cards with blinking lights on open ports. The user can click on the cards in the PBX graphic to show free cards, cards in use, and card types for each slot (trunks, analog lines, digital lines, etc.) The user can also view Port and LEN numbers, program key functions, telephone preferences, and perform other administrative duties.

Voice Mail SPE 28 lets the user manage voice mail features and functions. This module provides a single point of entry between the Master database 14 and the voice mail systems 44–48. From the Voice Mail SPE screen, the user can assign mailboxes, set preferences, and accomplish other administrative duties then download it to the voice mail system.

The 911 SPE module 30 is a single point of entry interface between the Master database 14 and National 911 Directory 50, which connects to the Automatic Location Information (ALI) of the users community. In the past, 911 calls were routed through a PBX. This would provide limited information to the responding emergency crews. This prevented emergency vehicles from easily responding to the correct building, floor, or room. The 911 SPE 30 provides emergency location information for users. It then updates the telephone company's ALI database accordingly. When an emergency call is placed, the telemanagement system does not even have to be on line. The call goes directly to the regional 911 Center where all location information in its databases has been kept up to date.

Figure 2:
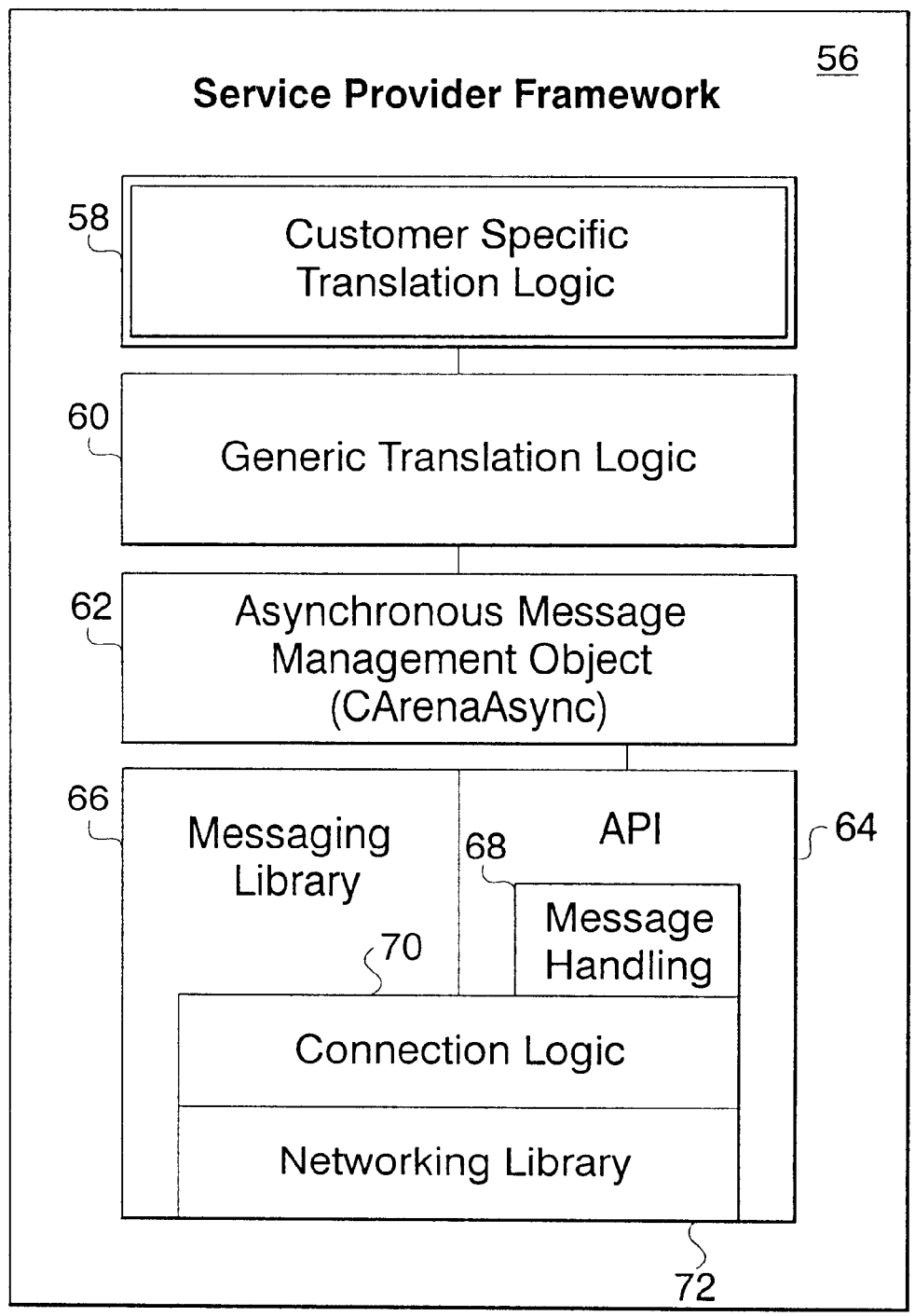
FIG. 2 is an object flow diagram of the framework for creating a service provider.

Customer External SPE 32 is a customer created service provider. A customer database 52 and/or a customer business system 54 can be managed by the telemanagement system of the present invention by creating a customer external SPE service provider 32. A toolkit is provided for this purpose. The toolkit contains object-file libraries, which have all the necessary messaging, connection and translation logic to create a service provider. This framework is shown in FIG. 2. The service provider framework 56 includes customer specific translation logic 58 provided by the customer. The customer specific translation logic is needed to convert (translate) the received data properties from their homogeneous form into a heterogeneous (system specific) form. In addition, this translation logic needs to read and translate data contained in the external system (heterogeneous form) into data properties in their homogeneous form. These properties are sent to the telemanagement system for storage in the Master Database. The translation is usually performed using simple mapping techniques and is dependent on the customer specific system being serviced.

Generic translation logic 60 contains all the necessary logic to run transparently on the users operating system, such as, a Windows 95 Tray Icon or a Windows NT Service Task. Asynchronous Message Management Object (CArenaAsync) 62 is a message handling logic. Other components of the framework are a message API 64, message handling program 68, messaging library 66, connection logic 70 and networking library 72. These additional components perform the following tasks: The message API 64 provides protected access to the message handling program 68 and utility logic contained in messaging library 66. Using this API, the CArenaAsync object can control message-handling services such as Subscription/Unsubscription. In addition, CArenaAsync can access utility logic (in the messaging library) such as message cracking, and message memory allocation/deallocation. The connection logic 70 maintains status information about the communication environment and other connected applications and is responsible for dealing with message retransmission and buffering. The connection logic calls specific functions contained in the networking library 72 to cause data to be received and transmitted. The networking library makes operating specific calls to send/receive the data packets.

A Service Provider is typically implemented as a Windows NT Service Task or a Windows 95 Tray Icon. Since many Service Providers were going to be developed all with similar basic requirements, the framework makes building the Service Providers easier.

The major components of the Service Provider are:

The shell application which contains all the necessary logic to run transparently as a Windows 95 Tray Icon or a Windows NT Service Task.

CArenaAsync—this is Arena handling logic made to operate in a Win32 environment.

Various Parsers—this provides basic message encoding/decoding routines for interpreting Client requests.

Figure 3:
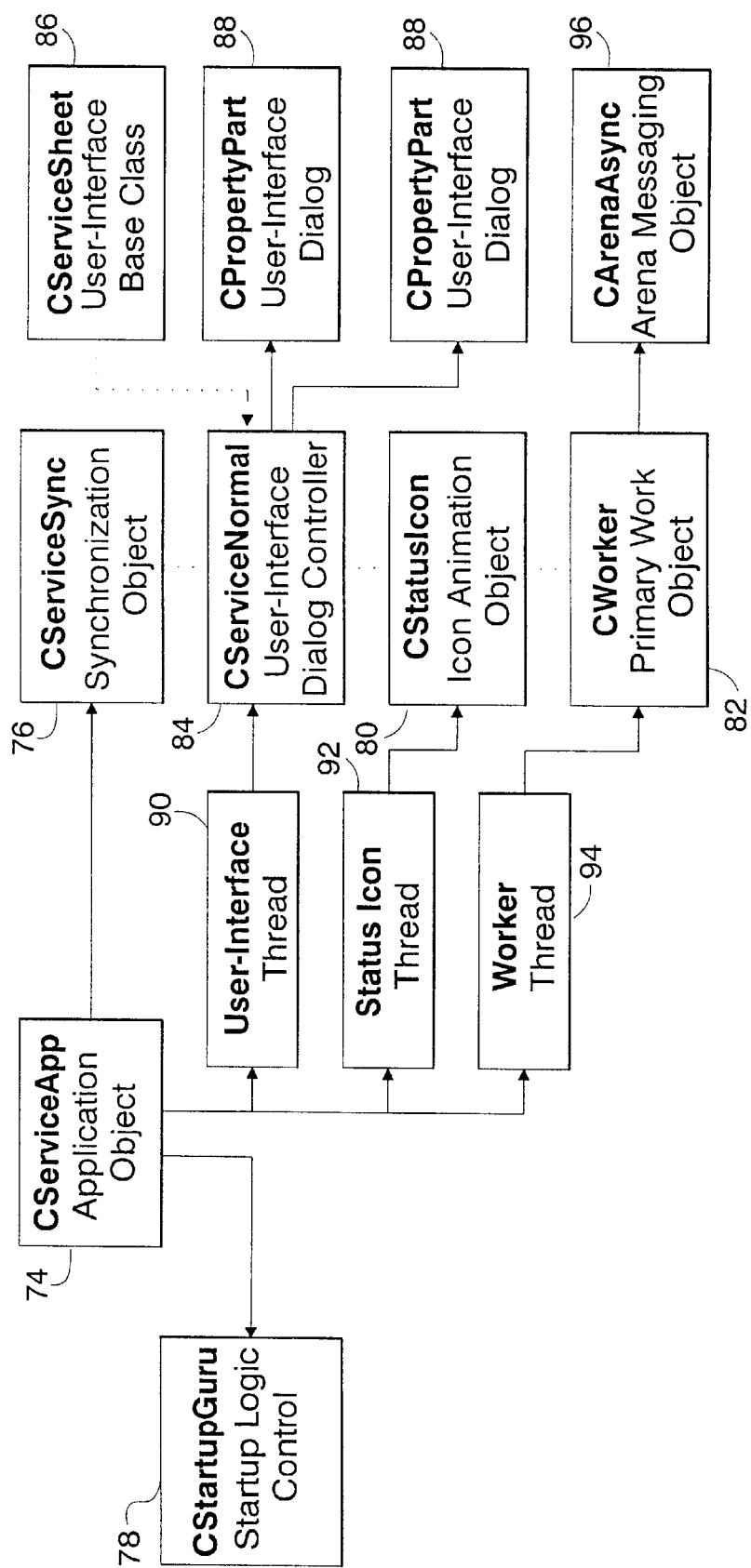
FIG. 3 is a block diagram of the software object for creating a service provider.

The shell application consists of several objects, which work together to provide a generic Windows application. The object relationship is shown in FIG. 3. These objects include CServiceApp 74, which is a primary application object. Object 74 is derived from a CWinApp (Win32 MFC class) and provides routines for starting, pausing, stopping, installing, and removing a Service Provider. CServiceSync 76 is a synchronization object. Object 76 provides mutual exclusion for globally accessed objects among threads. CStartupGuru 78 is a startup logic control object which provides routines for detecting which operating system is running, and which operating mode the application is running. CStatusIcon 80 is an object, which provides routines for controlling icon animation during messaging activity. This provides visual indication back to the user that the Service Provider is running. CWorker 82-is a primary worker object. This object runs in its own thread and may spawn other threads if needed. CServiceNormal 84 is a standard user-interface object. This object contains references to dialog panels added for each specific Service Provider. It is derived from CServiceSheet. CServiceSheet 86 is a standard user-interface base class. This object provides all standard controls for the Service Providers. This includes about boxes, system menus, restore/terminate controls, etc. CPropertyPart 88 is a base class for a single dialog panel. The software developer uses this class to derive specific dialogs for each Service Provider. Once a new class (derived from a CPropertyPart 88) is ready, the developer simply adds it to a list maintained in the CServiceNormal object 84. All display handling is automatic. There are multiple CPropertyParts 88 because it is often convenient to divide the user interface into a series of windowed tabs. Each tab (handled by an individual CPropertyPart object) can provide information for a specific feature of the Service Provider. For example, one tab may display setup/status information, while the next tab could display activity logs.

When a CServiceApp 74 starts, it creates three primary threads. These are thread 90 for the user1 interface, thread 92 for the Status Icon, and thread 94 for the worker. Each thread in turn creates its associated object and jumps to a processing method of that object.

How the threads are initialized depends on answers provided by the CStartupGuru object 78. This object takes care of the subtle differences between an application running on Windows NT and Windows 95/98 operating systems.

The first task usually performed by the Worker Thread 94 is to create a CArenaAsync object 96. This object spawns its own threads and handles Arena messaging traffic asynchronously from the Worker Thread 94. For example, upon construction, the CArenaAsync object 96 spawns two threads, one for reading messages and one for writing messages.

The CArenaAsync class 96 is intended for applications that need to wait on Arena events as well as other events. For example, a Service Provider may be waiting upon TCP/IP messages, Serial Port data, start/stop controls, and Arena messages all at the same time. This class has a state-event interface. No methods are blocking, except when synchronization is an issue with the background threads. In order to be aware of events, as they occur, the user must register a notification method. Two notification methods are supported:

(1) Kernel events (non-User-Interface threads)—this method notifies the application by calling the SetEvento method of a CEvent (Windows MFC) object.

(2) Windows messages (User-Interface threads)—this method notifies the application by sending a Windows messages via a PostMessage( ) Win32 call.

Typically, a user calls the methods in the following order after construction: Set notification, open connection, subscribe to events, wait and process, get event when ready and close connection.

In addition to handling the Arena connection/disconnection requirements, the CArenaAsync object 96 contains several methods for dealing with message parsing and routing control.

Methods of the CArenaAsync object 96 are described below:

CArenaAsync( )—Constructor. This spawns the background threads. This constructor has implicit calls to SetHost( ), SetName( ), and SetTransport( ) in it.

BOOL SetHost(LPCSTR=NULL)—Set host method. The parameter is the network name or IP address of the Arena host computer. It can be of the form "jupiter.incg.com" or "195.10.5.130". If no value is given, then the value is extracted from the registry. If the state is not IDLE, it is an error. Return value TRUE implies success, FALSE implies failure.

BOOL SetName(LPCSTR=NULL)—Set name method. The parameter is the application name of the service or application using this object. This is used internally by the Arena. If no value is given, then the value is taken from AfxGetAppName( ). If the state is not IDLE, it is an error. Return value TRUE implies success, FALSE implies failure.

BOOL SetTransport(int=0)—Set transport method. The parameter is the type of transport to use. Possible values are TCP/IP or MAILSLOTS. It is highly recommended that the default value be used. If no value is given, then the value is extracted from the registry. If the state is not IDLE, it is an error. Return value TRUE implies success, FALSE implies failure.

CString GetHost( )—Get host method. Return value is the current Arena host.

CString GetName( )—Get name method. Return value is the current application name.

int GetTransport( )—Get transport method. Return value is the current transport. Possible values are TCP/IP or MAILSLOTS.

int GetState( )—Get state method. Return value is the state of the object. Possible values are IDLE, OPENING, OPEN, and CLOSING.

int GetCountEventIn( )—Get count of in-events method. Return value is the number-of events, which are waiting for the user to process.

int GetCountEventOut( )—Get count of out-events method. Return value is the number of events, which are waiting for the background thread to process.

static LPCSTR TextOfState(int nState)—Get text of state method. Return value is the string. equivalent of the Arena State, suitable for display on a User Interface.

static LPCSTR TextOfEvent(int nEvent)—Get text of event method. Return value is the string equivalent of the Arena event, suitable for display on a User Interface.

BOOL Open( )—Open method. This causes the background thread to attempt to connect with the Arena server. It is permitted when the object is IDLE, and moves it into the OPENING state. If the return value is success, then an event will be generated when the actual Arena connection attempt succeeds or fails. Return value TRUE implies success, FALSE implies failure.

void Close( )—Close method. This causes the background thread to close its connection with the Arena server. It is permitted when the object is in any state except IDLE and CLOSING. If the return value is success, an event will be generated when the disconnect is complete. Return value TRUE implies success, FALSE implies failure.

BDOOL Subscribe(LPCSTR szHandle)—Subscribe method. This causes the background thread to subscribe to a set of messages from the Arena server. The handle must be 4 characters in length. It is permitted when the object is in the OPEN state. If the return value is success, an event will be generated when the subscribe is complete. Return value TRUE implies success, FALSE implies failure.

BOOL Unsubscribe(LPCSTR szHandle)—Unsubscribe method. This causes the background thread to unsubscribe to a set of messages from the Arena server. The usage is the same as Subscribe.

BOOL Write(LPCSTR szHandle, LPCSTR szMessage, CHeader*=NULL)—Write method. This causes the background thread to send the given message. The handle must be 4 characters in length. The message is a freeform null-terminated string. If no header is given, the message is broadcast. If the header is given, the message is delivered to a specific recipient. Valid headers should be obtained from the GetMessage( ) method. It is permitted when the object is in the OPEN state. If the return value is success, an event will be generated when the write is complete. Return value TRUE implies success, FALSE implies failure.

int GetEvent(BOOL& bSuccess, CString& strDesc, CTime* ptime=NULL)—Get event method. This retrieves the least recent event from the background thread. This is usually called upon receiving a notification. An event is simply the background thread's way of communicating with the user. The bsuccess flag will indicate whether the event is a success or failure. The strDesc string will describe the event when appropriate. The ptime result is the event timestamp, if present. Return value is the type of event. The possible event types are NULL, OPEN, CLOSE, SUBSCRIBE, UNSUBSCRIBE, READ, and WRITE. If the event type is READ, then strDesc will contain the handle and GetMessage( ) can be called to retrieve the actual message and sender address.

BOOL GetMessage(CString& strMessage, CHeader*= NULL)

BOOL GetMessage( CStringArray& straMsg, CHeader*= NULL)—Get message methods. This retrieves the message contents from the most recent READ event. This is called upon receiving a READ event from GetEvent( ). The strMessage string will be set to the message contents. Alternatively, the straMsg string array will be set to the parsed message arguments. (See ParseMessage( ).) The pHeader structure, if present, will be set to the sender's address, id, and channel. Return value TRUE implies success, FALSE implies failure.

static void ParseMessage(LPCSTR szMessage, CStringArray& straMsg)—Parse message method. This parses a string into arguments. Its input is the szMessage string and the output is the straMsg string array. The arguments are space-separated. Quotes have the special feature of causing spaces to be treated as normal characters until the next quote. Backslashes have the special feature of causing the following character to be treated as normal.

void ClearNotification( )

void SetNotification(HANDLE hEvent)

void SetNotification(HWND hwnd, UINT uMessage)— Notification methods. These methods set the action that the object takes when the object has an event available. ClearNotification( ) causes no action to be taken (the default). SetNotification( ) with hEvent, typical for a worker thread, causes that kernel event to be signaled with Win32 SetEvent( ) as a notification. SetNotification( ) with hWnd and uMessage, typical for a user interface, causes that window to be signaled with Win32 PostMessage( ).

Once the CArenaAsync 96 object has been opened, the Worker Thread 94 usually subscribes to a global listening event. This event (usually called ESPE) is typically the first contact the Service Provider has with the Manager. In some cases it also necessary for the Service Provider to subscribe to its own application handle. This allows the Manager to request the Service Provider to switch-over communication to its private application handle.

Data Encoding/Decoding

The ParseMessage( ) method of the CArenaAsync object 96 handles the parsing of an incoming Arena message. The format of the message is typically in the form of:

<command> <key|command-modifier> <parameters>

The command identifies which Service Provider function is to be performed and the key or command-modifier further determines what data element or sub- command is required. The parameters are typically either property-names or property-name-value pairs. Some sample messages are provided below:

mget 4662 name class password. This instructs the Service Provider to fetch the name, class, and password properties for key 4662.

mset 4662 dept "Accounting". This instructs the Service Provider to change the dept property for key 4662 to the value "Accounting".

When parsing the parameter list, the message may contain special characters. For example, if a set of curly brackets "{ }" surround a parameter, the parameter is treated as a single element. Likewise double-quotes "" may be used to indicate embedded spaces of a parameter. The parser is designed to accept an arbitrary character array and return an list of message words.

Figure 4A:
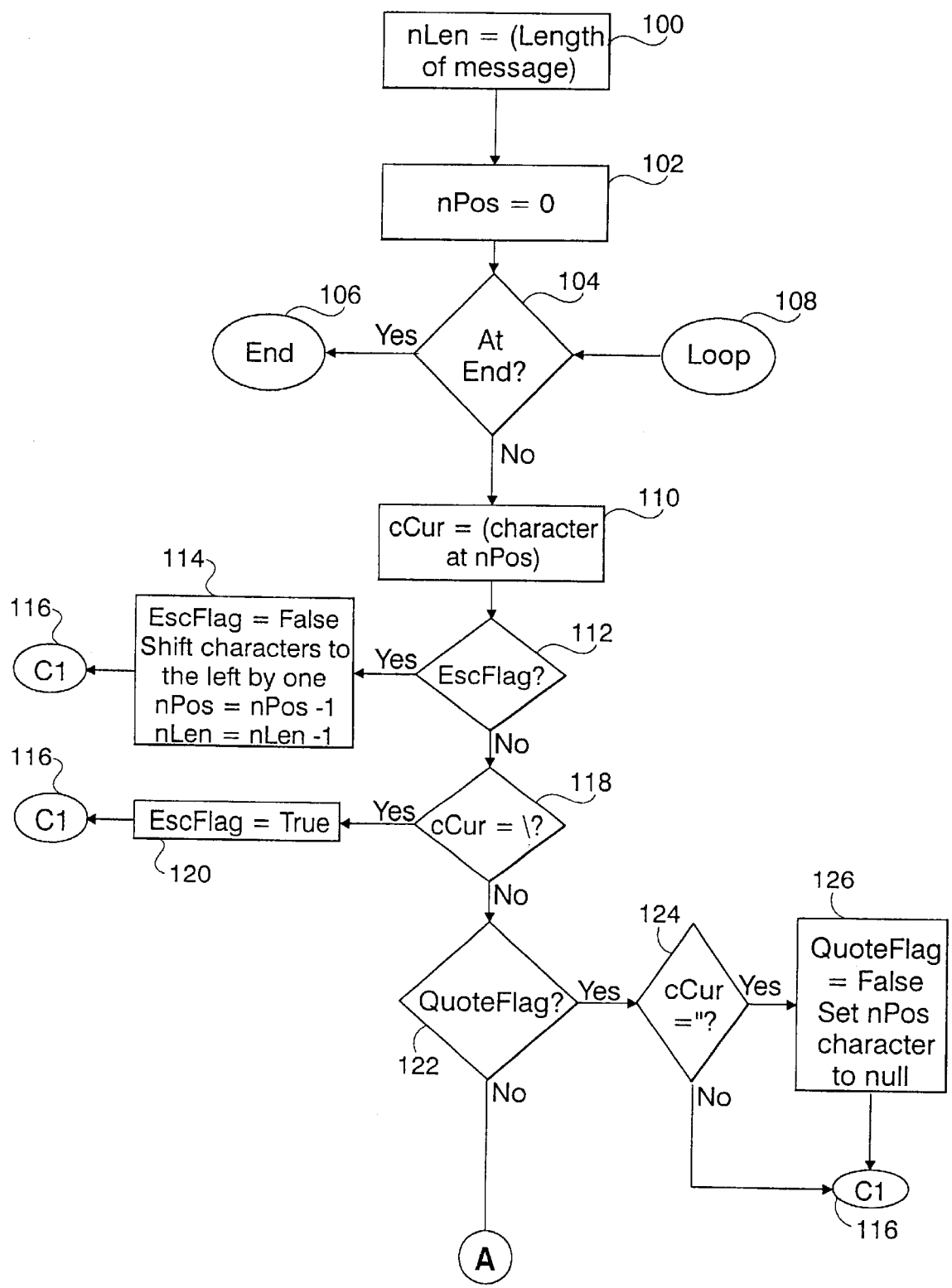
FIGS. 4A and 4B bridged by connector A show a flow diagram of the processing logic for data encoding/decoding.
Figure 4B:
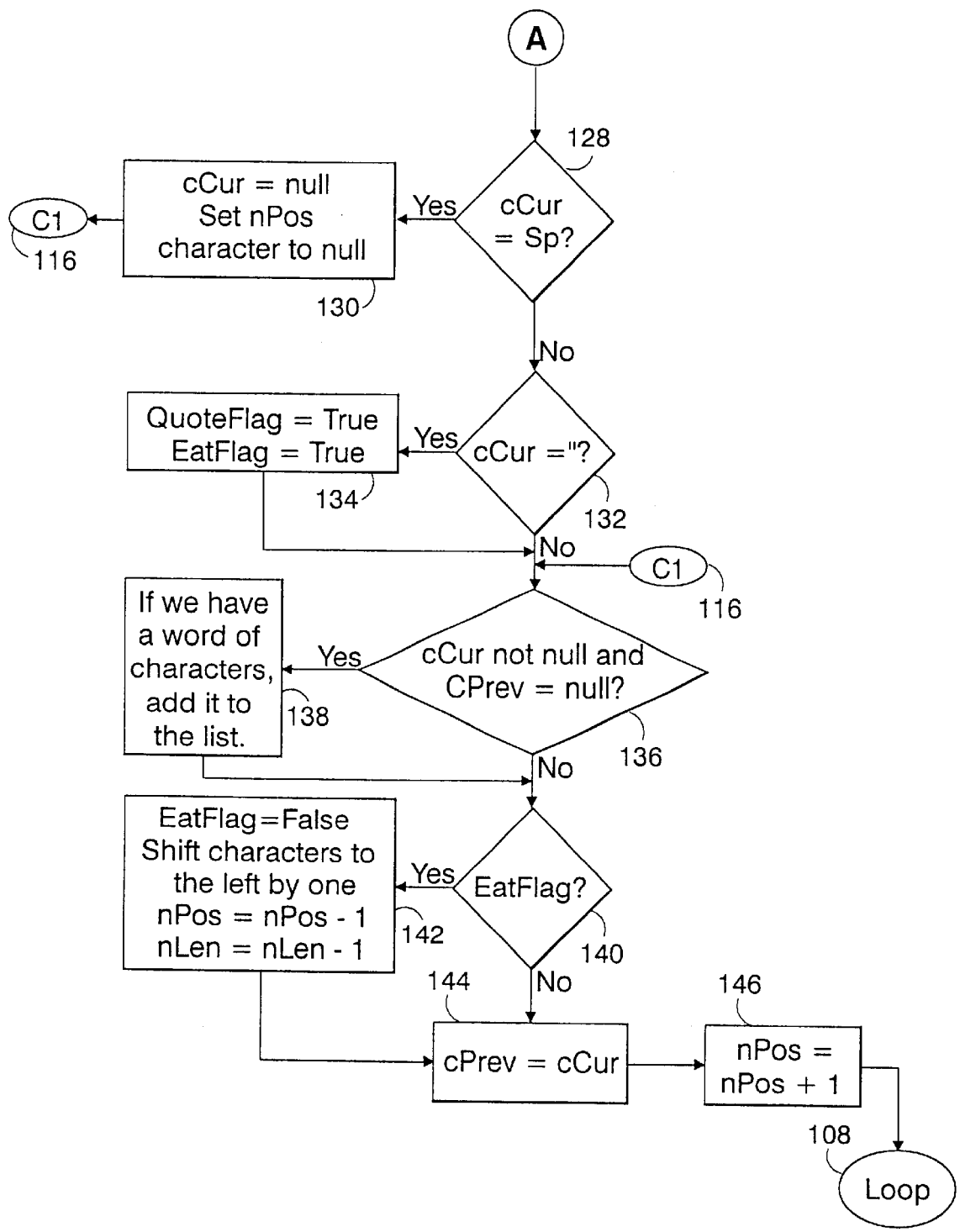

The parsing logic is as shown in FIGS. 4A and 4B. At block 100, the overall length of the message is determined and stored in nLen. Block 102 resets the current position being evaluated nPos back to zero. The top of the parsing loop starts at 108, with decision block 104 determining if the end of message has been reached. If yes, the parsing ends at 106. If no, block 110 retrieves the current character selected by the current position npos and stores the character into ccur. Then a series of evaluations are performed on the current character cCur. The first is decision block 112, which determines if the EscFlag has been previously set. This flag was cleared prior to entry of this routine. If the flag-has been set, the yes branch at 112 is taken, and decision block 114 is performed. This block 114 resets the EscFlag, and throws away the current character by shifting all characters in the message to the left by one. The current position npos and the message length nLen are decremented to reflect the removal of the current character. The process continues to connection 116. If the flag was not set, the no branch at 112 is taken. Decision block 118 determines if the current character is a backslash "\". If yes, this is the escape character, and block 120 sets the EscFlag, then proceeds to connection 116. If no, decision block 122 is executed. Decision block 122 determines if the QuoteFlag has been set. This flag was cleared prior to entry of this routine. If yes, decision block 124 is used to determine if the current character is a double-quotation mark. If this is true, block 126 is executed which resets the QuoteFlag, and sets the character in the message pointed to by the current position npos to a zero (null), then execution continues to connection 116. If decision block 124 is false, meaning the current character is not a double-quotation mark, then execution continues to connection 116. If decision block 122 determines the QuoteFlag was not set, the no branch at 122 is taken, and decision block 128 is processed. Decision block 128 determines if the current character is a space. If this is true, block 130 sets the current character cCur to zero (null) and sets the character in the message pointed to by the current position npos to a zero (null), then continues to connection 116. If false, decision block 132 is processed. Decision block 132 determines if the current character is a double-quotation mark. If this is true, block 134 sets the QuoteFlag and EatFlag to true and continues to decision block 136. If not, decision block 136 is executed. Decision block 136 determines if the current character ccur is not a zero (null), and the previous character cPrev is a zero (null). If this is true, we have parsed a word of the message and the word is added to a list of message parts, and continues to decision block 140. If not, decision block 140 is executed. Decision block 140 determines if the EatFlag has been set. If true, decision block 142 is performed. This block 142 resets the EatFlag, and throws away the current character by shifting all characters in the message to the left by one. The current position nPos and the message length nLen are decremented to reflect the removal of the current character. The process continues to block 144. If decision block 140 is false, block 144 is executed. Block 144 saves the current character into the previous character cprev and proceeds to block 146. Block 146 increments-the current position nPos by one, and continues to the top of the loop 108.

The commands typically supported by a Service Provider are grouped into three categories:

Configuration Commands. These commands are responsible for retrieving version information, supported properties by the PBX and adjunct systems, and Arena application handles. The commands are:
(1) info version—retrieves version information.
(2) info handle—retrieves Service Provider's Arena application handle.
(3) info field—retrieves property information.

Manipulation Commands. These commands are responsible for reading, adding, changing, and deleting information on the PBX and adjunct systems maintained by the Service Provider. The commands are:
(1) mget—retrieves a single user entry.
(2) madd—adds a single user entry.
(3) mset—changes a property on a single user entry.
(4) mdel—removes a single user entry.
(5) mren—changes the user entry key to another value.

Navigation Commands. These commands are responsible for positioning within the PBX and adjunct systems' database. The commands are:
(1) mtop—position to the first logical record.
(2) mnxt—position to the next logical record.
(3) mcnt—retrieves the total number of user entries.
(4) mlst—retrieves every user entry in the PBX and adjunct systems.

Configuration Commands are as follows:
(1) Retrieve Service Provider version information. Allows the system to detect that a Service Provider is functioning and available for use.
(2) Retrieve Service Provider Arena Application Handle. Allows the system to acquire a private channel for the Service Provider. Note—Responds only when <application> equals the Service Provider application name.
(3) Retrieve Service Provider Property List. Allows the system to configure an appropriate database table for this Service Provider.

Manipulation Commands are as follows:
(1) Retrieve selected properties for a single user entry from the Service Provider. Allows the system to read information from the PBX or adjunct system maintained by the Service Provider.
(2) Retrieve all properties for a single user entry from the Service Provider. Allows the system to read information from the PBX or adjunct system maintained by the Service Provider.
(3) Adds a single user entry to the system. Allows the system to add information into the PBX and adjunct systems maintained by the Service Provider.
(4) Changes a single user entry in the system. Allows the system to modify information in the PBX and adjunct systems maintained by the Service Provider.
(5) Deletes a single user entry in the system. Allows the system to remove information in the PBX and adjunct systems maintained by the Service Provider.
(6) Renames a user entry key. Allows the system to rename the user entry key on the PBX and adjunct systems maintained by the Service Provider.

Navigation Commands are as follows:
(1) Positions to the first logical record. Allows the system to position to the first logical record in the PBX and adjunct systems maintained by the Service Provider.
(2) Positions to the next logical record. Allows the system to position to the next logical record in the PBX and adjunct systems maintained by the Service Provider.
(3) Returns the number of user entries. Allows the system to determine the total number of user entries in the PBX and adjunct systems maintained by the Service Provider.
(4) Returns all user entries in the PBX and adjunct systems. Allows the system to retrieve all user entries in the PBX and adjunct systems maintained by the Service Provider.

In an illustrative embodiment, Arena is implemented as a Windows NT Service Task with a mixture of C and C++. It can also run as a Windows 95 Tray Icon (Background task).

The primary components of the Arena are the Messaging Server 68 and a Client-side Library 66 (See FIG. 2).

The Messaging Server is responsible for the following: (1) Network Connection Creation and Tear-down, (2) Application Registration/Unregistration, (3) Message Subscription/Unsubscription and (4) Message Routing and Dispatch.

The Arena manages its messaging environment with the use of several data structures: (1) Table of application handles, (2) Table of associations between message types and application handles hashed by message type, (3) Table of associations between message types and application handles hashed by application handle, and (4) Message packets.

Application handles and message types are defined as a 4-byte human-readable string. This allows the Arena to cast a message type or application handle to an unsigned long. This enables 32-bit integer comparisons instead of strcmp. Integer comparisons are very fast on Intel 32-bit architecture.

Two Message Type tables are maintained (one hashed by message type, and another hashed by application handle). The two tables provide superior performance under heavy messaging traffic.

Message packets in the Arena are always sent in two parts: a header section, and a message body.

The header contains the following:
(1) Magic number—used to verify header is valid.
(2) Source application handle—4-character handle of the sending application.

(3) Source Channel—number that indicates which communication pipeline was used to send the message.
(4) Destination application handle (if known)—application which should receive the message. This is blank if the message is intended to be a broadcast.
(5) Message length—length of message body in bytes.
(6) Message sequence number—auto-incremented integer that uniquely identifies the message.
(7) Message ID—message sequence number of the requesting command packet (used only for RPC-type messages).
(8) Message Type (Event Name)—4-character identifier that indicates the type of message (application defined).

The Arena itself is multi-threaded. Each thread communicates with the others through shared memory-queues.

For each incoming connection request, the Connection Management Thread spawns a new Incoming Service Thread. One application may have one or more associated service threads.

An Arena Client application typically goes through the following steps: (1) connect to Arena, (2) Register the Application, (3) Add a RPC Channel, (4) Subscribe to Events, (5) Read and Post Events, and (6) Disconnect from Arena.

These steps are described below.

Connection

Connecting to the Arena involves calling an arena_connect( ) function in the Arena Client Library. This function essentially causes the Connection Management Thread to spawn an Incoming Service Thread.

In the Arena, an application can have multiple channels. A channel is a complete communication pipeline private to the application. Separate channels are used throughout applications as an efficient way of separating primary command pipelines from asynchronous incoming events. When an application first connects to the Arena one channel is automatically assigned. This is called the normal channel. It represents the primary communication pipeline between the Arena and an application. It is the only channel that can be used to send system-related packets (i.e. messages which requests services from the Arena itself).

Application Registration

After connection, an application can send the Arena system-related messages. These messages are used to configure the various Arena services for the application. One such service is registration. When an application registers with the Arena it is assigned a unique application handle. An application handle is a human-readable 4-character string. The first application handle starts with aaaa and is incremented each time an application registers (i.e. baaa, caaa, etc.).

Once an application has an application handle, the application can make itself known to other Arena applications. This handle can be passed in messages that other applications receive and can be used to respond directly back to a particular recipient. Registration with the Arena also causes a messaging queue and Posting Service Thread to be created. An application can register by calling the arena_register( ) function.

Adding a Second Channel

After registration, an application typically requests a second communication pipeline from the Arena. The application can use this pipeline for RPC messages (i.e. send-and-wait-for-response message sequence) without the worry of an unsolicited incoming packet interfering with the response packet of the RPC. To add a second channel, the application makes a call to the arena_add_channel( ) function in the Arena Client Library. In reality, this function call is really a connect sequence, followed by a ADD_CHANNEL system message.

Message Subscription

Subscription to a particular event is accomplished by sending a subscription request message to the Arena over the normal channel. This packet contains the Message Type to be added to the application's subscription list. Once a particular message type has been subscribed, any message posted to the Arena that matches the specified type will be forwarded to the subscribing application. A client must call arena_subscribe(Event) to access this service.

Message Processing

Figure 5:
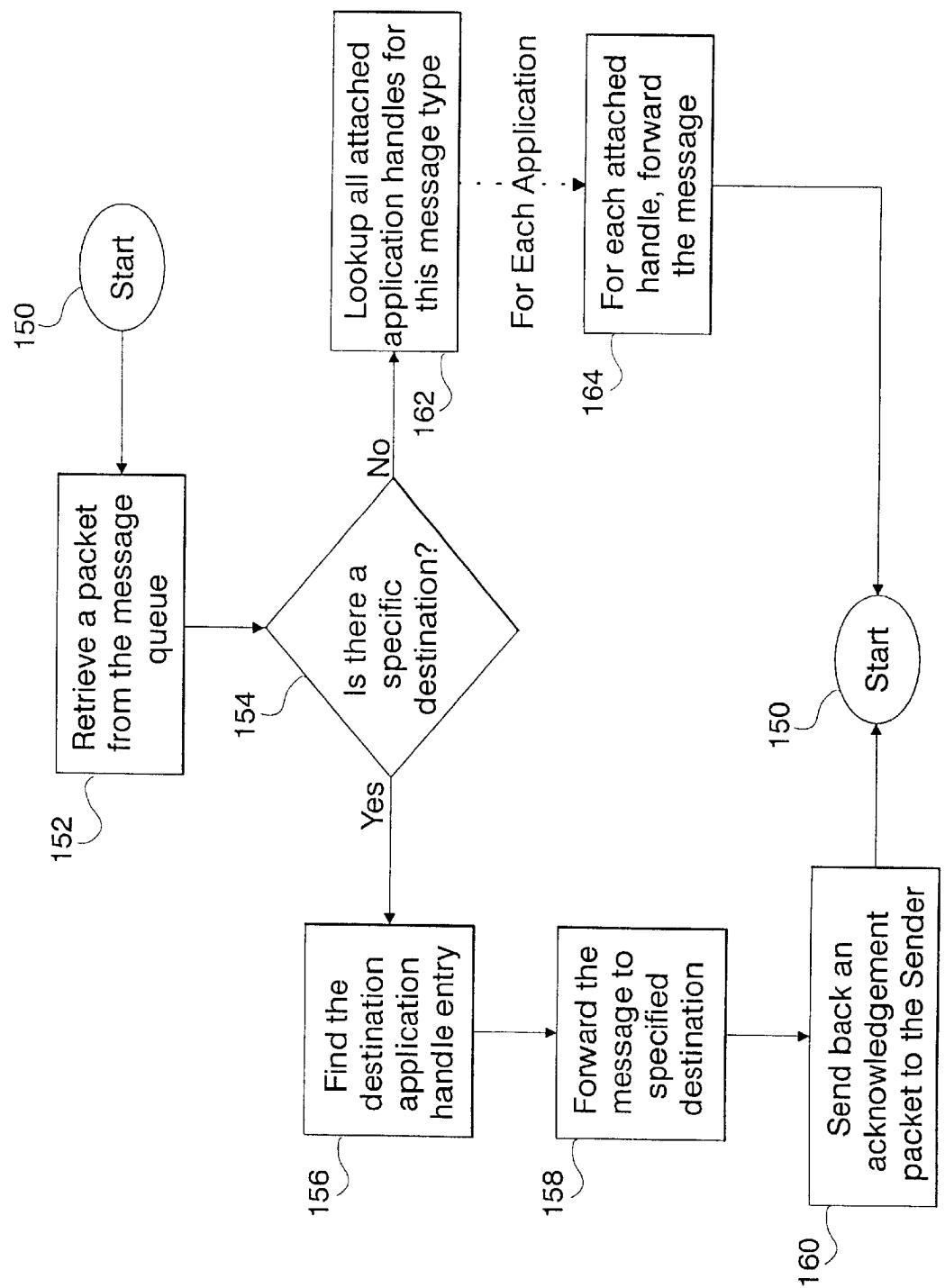
FIG. 5 is a block diagram of the logic for processing a message in arena.

If the message received by the Incoming Service Thread is not a system-related message, it is simply passed into the messaging queue. The messaging queue links the Incoming Service Thread with the Posting Service Thread through shared memory. The Posting Service Thread pulls a message from the queue, determines if the message was destined for a particular application handle, and sends the packet. It essentially follows the logic shown in FIG. 5. The message processing starts at 150 and a block 152 retrieves a packet from the message queue. At decision block 154 the question is asked "is there a specific destination?" If the answer is yes, at block 156 a destination application handle entry is found, at block 158 the message is forwarded to a specified destination and at block 160 an acknowledgment is sent back to the sender. The process then returns to start 150. At decision block 154 if the answer is no, at 162 the process looks up all attached application handles for this message typed and for each application at block 164 the message if forwarded for each attached handle. The process then also returns to start 150.

Disconnection

A disconnection request is received over the normal channel and is processed by the Incoming Service Thread. It causes the following to occur: (1) look up application table entry, (2) send a remove channel command to each channel (except normal), (3) each removed channel closes the posting thread to terminate, (4) when the posting thread is terminated, the incoming service thread for that channel terminates, (5) when all auxiliary channels are removed, the incoming service thread (normal) unregisters the application handle, (6) unregistering causes all subscribed message types to be detached from the terminating application handle, and (7) the application handle table entry is removed and the incoming service thread closes connections and terminates.

Referring back to FIG. 1, the Manager 12 is the primary user-interface for the Client-side of the system. In an illustrative embodiment, it is a Windows NT/95 32-bit application written in Object Pascal. This application has many dialogs and features but the important ones with regard to Single-Point-of-Entry are: (1) SPE Configuration Dialogs 16, (2) Master Database Management 18; (3) Learn Feature 20 for a single user and (4) Global Synchronization 22.

These features work together to provide the overall effect of Single-Point-of-Entry. These features are explained in detail below.

Before a-Service Provider can be used it must first be configured. This is accomplished be using the System Setup Dialog located under the Maintenance Menu. The Dialog has many options but the ones related to each Service Provider are: (1) PBX Switch SPE Configuration, (2) Voice Mail SPE Configuration, (3) E911 SPE Configuration, and (4) External Applications Configuration.

When the option is first selected, the Manager performs the following steps: In the first step, an ESPE message is posted to the Arena. The message data contains a message called "infoversion". This message is broadcasted to all listening (subscribed) external service providers. In the second step, a five second clock is started. During that time, the manager listens for responses to the infoversion command. In the third step, as each request comes in, the manager displays the application to the user. It also makes note of the source application handle of the response. Finally, once displayed, the user can select which SPE is to be configured and presses the configured application button, and the SPE configuration dialog is then displayed.

The Single-Point-of-Entry configuration dialog is used to select which properties the system will manage. A user does not have to manage all supported properties by a Service Provider.

The configuration dialog includes a window for displaying a property list and as responses come back from the service provider they are displayed on the list. Add and remove controls are provided so the user can select which properties are to be managed. Once the properties have been selected, the user can press a create table button to add a new table to the master database. A button is also provided for causing an infofield message to be posted to the Arena. This packet is sent directly to a specific service provider.

The configuration Process continues with the configuration dialog sending an infofield message directly to the selected Service Provider. The-response to that request is displayed for the user in the included list. At the same time, the dialog checks a database table (EXCONFIG) to see if the property has been selected in a prior configuration for this Service Provider. If found, the entry is moved to the included list. In the next step, after the user has selected the desired properties, the create table button is pressed, causing a new database table to be created using the Service Provider name as the table name. In addition, the user can override the default values for the selected properties. When the user is finished, the okay button is pressed and property selections and default values are written out to the database table (EXCONFIG).

A split-window-tables user interface design is used for the configuration dialog. The master database (or the appearance of) is controlled via the Master Database Controls. The following buttons are provided: Record Insertion, Record Deletion, Record Editing (Prevents other users from changing record), Record Posting (Commitsk changes to master database, Record Cancel (Cancels pending changes), Record Refresh (Rereads immediate changes from other users).

The Service Provider is controlled via the Service Provider Controls. The following buttons are provided: Learn (One-Record Synchronization Feature), Add (Sends record to Service Provider and adds to the PBX or adjunct system), Change (Sends record to Service Provider and changes PBX or adjunct system) and Delete (Sends record to Service Provider and deletes from the PBX or adjunct system).

Many providers are of the single system type, however, in some instances it is convenient to support multiple systems in a single provider.

In a multiple system Service Provider, the SPE Configuration protocol provides some additional configuration packets. These packets (also info messages) provide the client software with the ability to interrogate the Service Provider for a list of the supported systems. With this list, the client software can then interrogate the Service Provider for a list of supported properties for each supported system A multiple system Service Provider enables the software developer to consolidate similar translation logic into a single task. For example, in FIG. 1 all three voice mail system types 44–46 are managed by a single Service Provider 28. Since every Voice Mail System shares similar features (i.e. mailbox number, name, etc.), the translation logic for the similar features can be consolidated into a single provider. This allows the benefits of an object-oriented design to be maximized.

Figure 6:
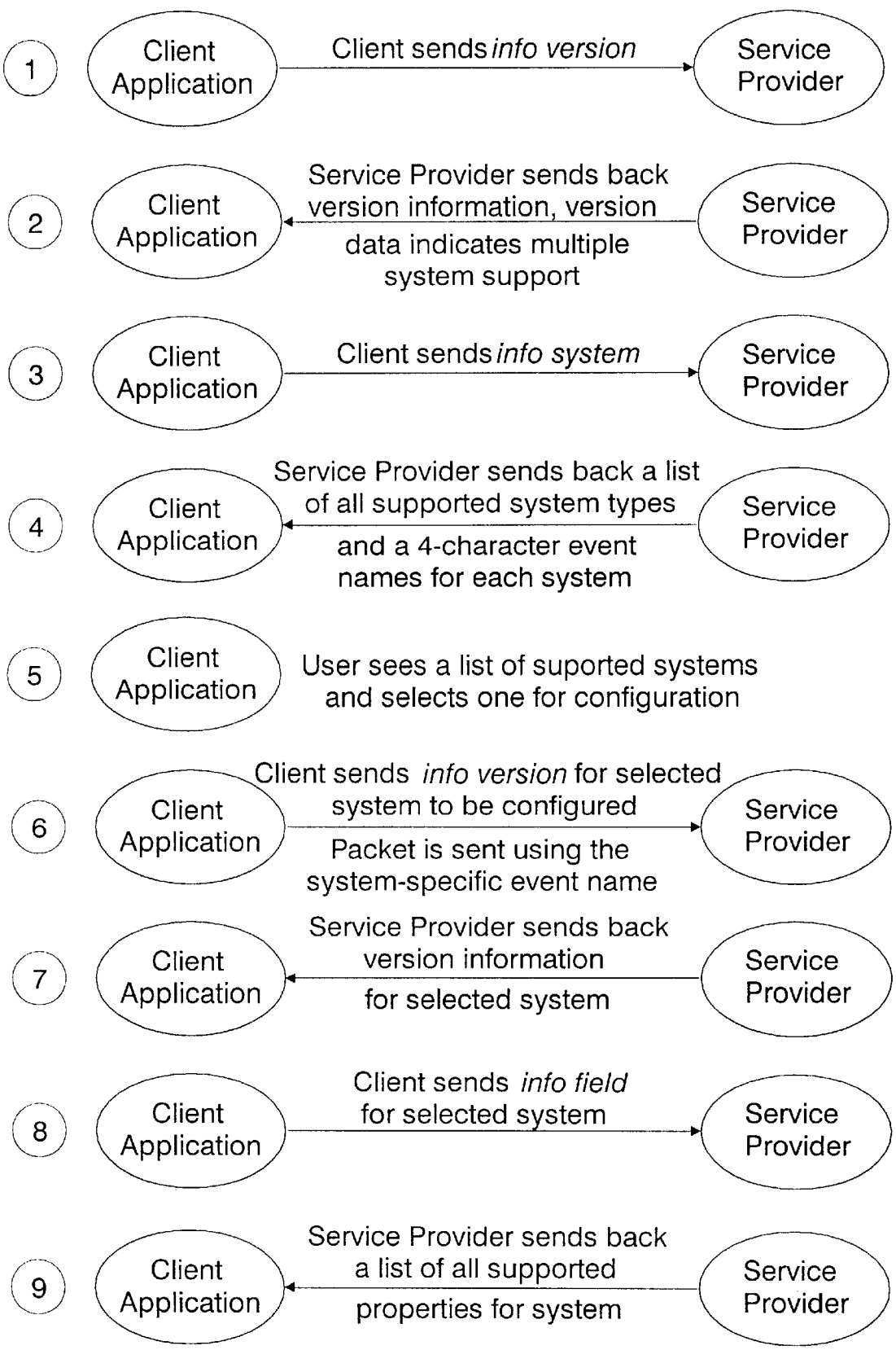
FIG. 6 is a flow diagram of the SPE configuration protocol.

The multiple systems SPE Configuration protocol is shown in FIG. 6. In step (1) the client application sends infoversion to the Service Provider. In step (2) the Service Provider sends back version information, version data indicates multiple system support. In step (3) the client sends infosystem to the Service Provider. In step (4) the Service Provider sends back a list of all supporter system types and a full character event name for each system. In step (5) the user sees a list of supporter systems and selects one configuration. In step (6) the client sends infoversion for the selected system to be configured. The packet is sent using the system specific event name. In step (7) the Service Provider sends back version information for the selected system. In step (8) the client sends infofield for the selected system to the Service Provider. In step (9) the Service Provider sends back a list of all supported properties for the system. Thereafter, one or more of the supported properties can be configured for management by the client application.

One important feature of a property is a Default Value. The user has the ability to modify property default values. This is accessed on a tab of the configuration dialog. A default value can be more than a simple static number or string. It can be a property name, which is substituted for the real data when the record is created. For example, a default value of "Y" set for the property "Tutorial Flag", will result in a "Y" being entered for this property at record creation.

However, a default value can contain variable substitution. Any data in between a set of square brackets "[ ]" is replaced at record creation time. The variable name inside the brackets references a property name from the master database. By using variable substitution, the end-user can effectively share information from one system to another.

In addition, the end-user can cause all default values to be reprocessed at anytime by pressing the Defaults button on any Service Provider Access tab.

The initial values for property defaults originate from the Service Provider itself. When the Provider is interrogated for a list of supported properties, the recommended default values are sent back with each field. In this way the software developer of the Provider can pull information from other parts of the system without having to bother the end-user in configuring each default value.

However, the end-user can override any recommended default by using the property configuration dialog. This dialog is displayed when the SPE is configured for the first time. After the property selections are written out to the database, the Service Provider is ready for use.

Referring again to FIG. 1, the Master Database Management 18 will now be described. The Master Database 14 is actually a collection of many databases tied together through a common identifier. This identifier is called the user-identification, or uid. The uid is an integer within the range of 1 to $2^{64}-1$. Zero is reserved for the indication'that the record is not assigned. This allows the management of system resources that need to be programmed but not yet associated with any particular user.

The actual database organization is dynamic—it changes based on configuration options selected by the user.

For every Service Provider 26–32 there is at least one xxCONFIG table and a property data table. The exception is the PBX SPE 26. In one embodiment, because of special requirements for the PBX Service Provider 26, the PBCONFIG table is "built-in" to the Manager 12 and is not under user control. The number of property data tables depends on the number of system types supported by that particular Service Provider.

By using the USER table as an anchor, the Manager 12 flattens the other tables into a single data view. It does this by simply working with all the tables as a group, using the uid as a common key. In addition, a single set of user-interface controls are tied together that causes all tables to be read (and written) at the same time.

The system compensates for performance issues by using caching techniques and just-in-time database reads. For example, the system holds off accessing a particular table until the last possible moment. In this way, the user is not held up waiting for database activity on information that is not needed at that time.

Dynamic User Interface Generation

When the User Editor of the Master Database Management feature 18 is launched, the Manager interrogates the xxCONFIG tables for configured iproperties. If properties have been configured for that particular Service Provider, a tab is created on the right-hand side of the interface. On that tab property-editing fields are created (depending on property access flags), and editing controls are created. All of this occurs dynamically, allowing the user to reconfigure at will. This provides the user with full control of the complexity of the User Editor.

The xxCONFIG tables contain all the information necessary to create the dynamic screens. At a minimum, they contain the following fields:

Application Name—holds a unique name for each configured Service Provider.
Field Number—a sequencing number used to keep properties in a certain order.
Category—a mechanism that the Service Provider can use to group properties. This makes the user-interface more organized and easier to use.
Field Name—holds the displayable property name. SPE Name—holds the internal property name that is used on all messaging between the Manager and the Service Provider.
Field Access—contains a set of flags which indicate Read-Only, Write-Only, or Read-Write access to this property. This field affects how the controls are generated. For example, Read-Only properties generate only static-text controls and cannot be edited.
Description—holds a displayable free formatted description of the property.
Field Length—holds the maximum number of characters accepted for this field.
Default Values—holds a set of default values for each user profile category. This allows the Manager to use a different set of defaults based on the category of the user (i.e. executive, administration, etc.)
Service Provider Version—holds the version information of the Service Provider. This allows the Manager to verify that the SPE Configuration is not out-of-date with the Provider.

One Record Synchronization

The Learn Feature. 20 of the user-interface is probably the most important feature to the end-user. It sorts out all the "details" in synchronizing the Master tables with the PBX or adjunct system attached to the Service Provider.

At the top of each Service Provider Access tab is a checkbox. This checkbox provides the user with the ability to create an instance of this user entry on the PBX or adjunct system. When the checkbox is checked, the Master Database tables are updated to indicate the user's intent to add this entry to the system. Default values are processed, and the tab displays the configured properties.

Once the Default Values have been filled in, the user can make adjustments to the displayed values, save the entry into the Master Database 14, and/or update the system by pressing Add.

From either of these two states (checked or unchecked), the user has the option of pressing Learn.

Figure 7A:
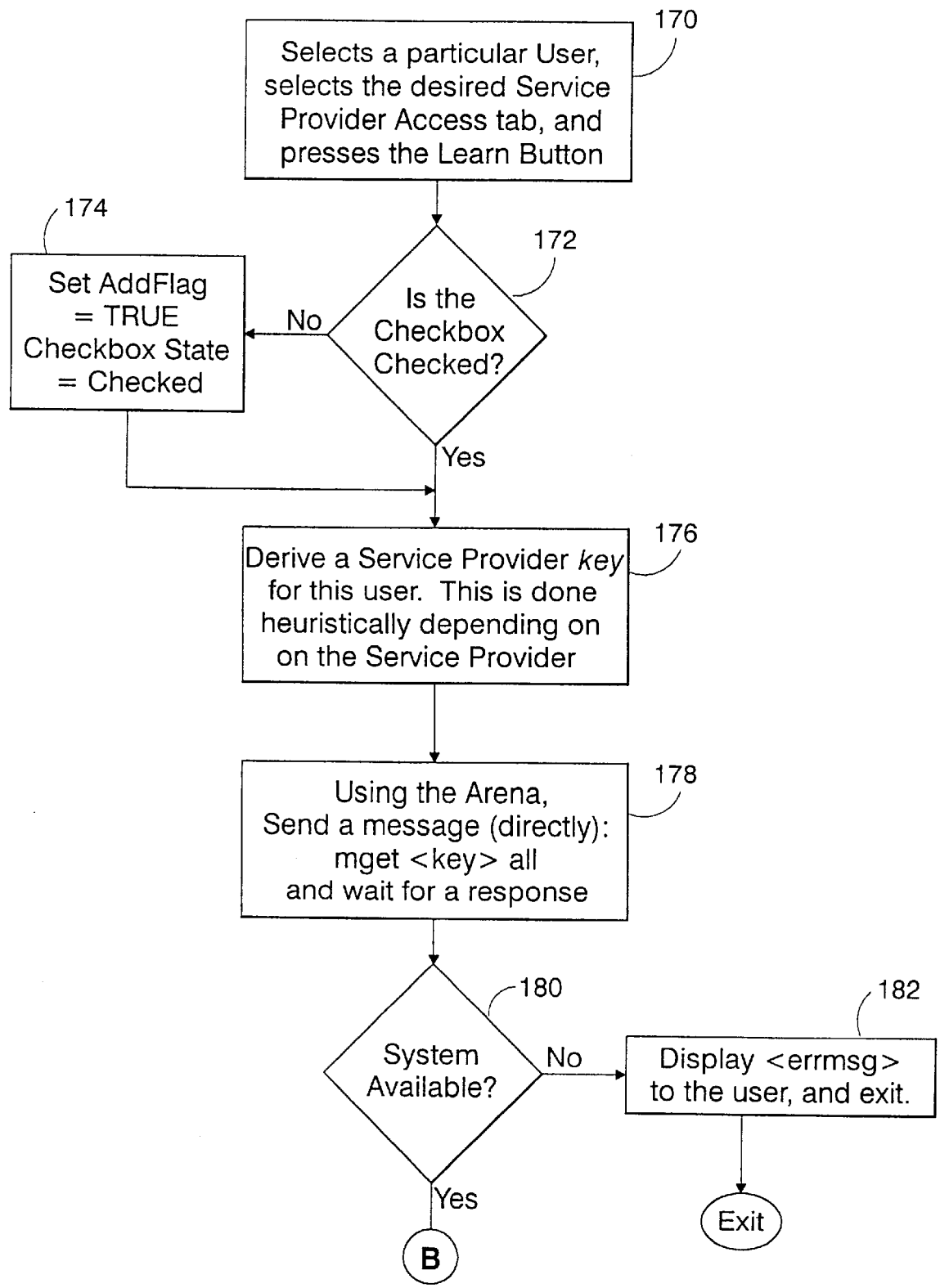
FIGS. 7A and 7B bridged by connector B show a flow diagram of the method for synchronizing a single database.
Figure 7B:
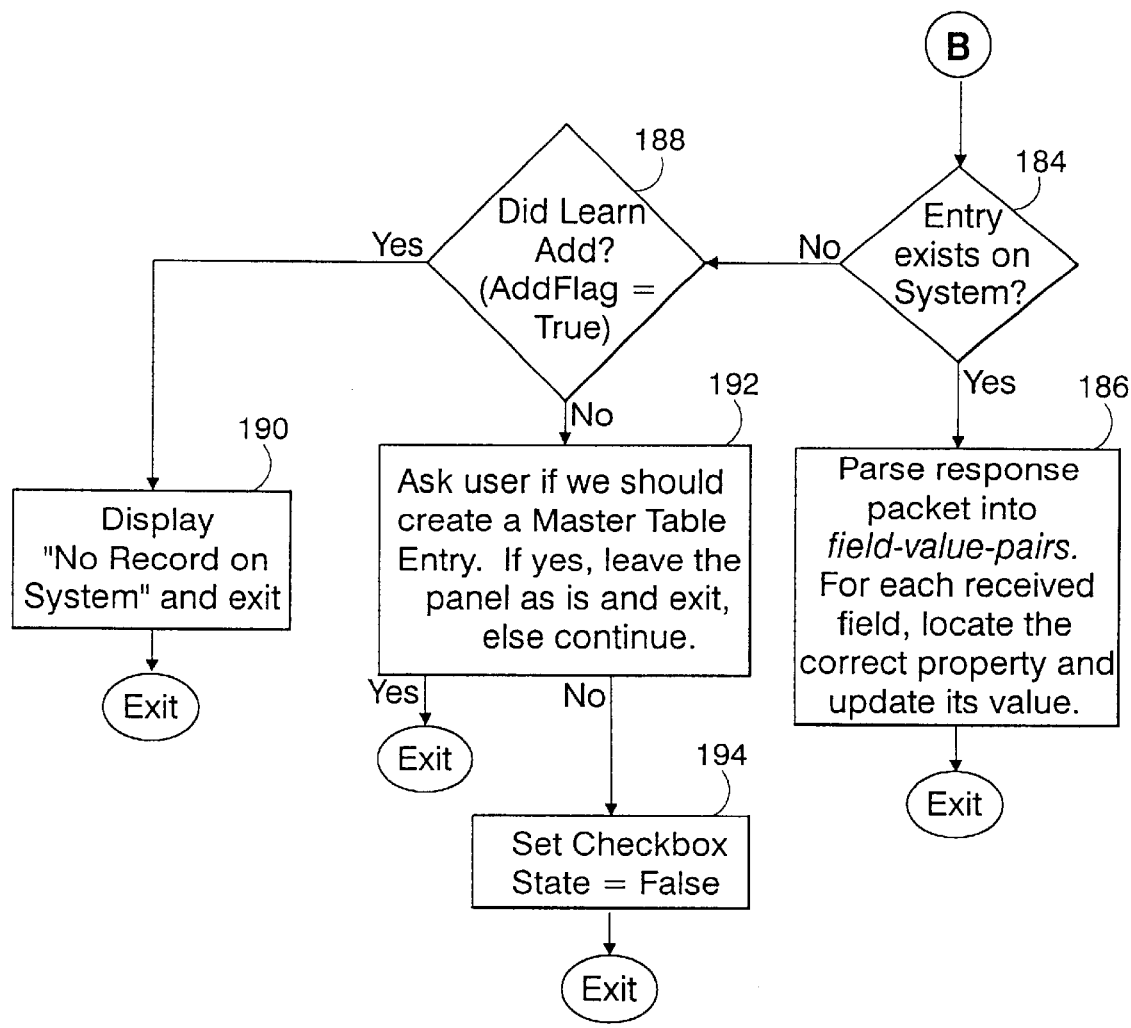

If pressed, the Manager 12 goes through the steps shown in FIGS. 7A and 7B. In Step 170 the user selects a particular user, selects the desired Service Provider access tab and presses the learn button. In decision block 172, the Manager asks whether the checkbox is checked? If the answer is no, in block 174 the Manager sets AddFlag to True and checkbox state to checked. If the answer in decision block is yes, the Manager derives a Service Provider key for the user. This is done heuristically depending on the Service Provider. Next, in block 178 using the Arena, the Manager sends a message (directly): mget <key> all, and waits for a response. At decision block 180 the Manager asks if the PBX or adjunct system is available? If the answer is no, in block 182 the Manager displays <errmsg> to the user and exits. If the answer at decision block 180 is yes, another decision block 184 asks whether an entry exists on the system. If the answer is yes, the Manager parses the response packet into field-value-pairs. For each received field, the Manager locates the correct property and updates its value. If the answer to decision block 184 is no, another decision block 188 asks whether the system learned add? In other words, is the AddFlag=true. If the answer to decision block 188 is yes, then at block 190 the Manager displays "no record on system" and exits. If the answer to decision block 188 is no, the Manager asks the user if it we should create a Master Table Entry. If yes, the Manager leaves the panel as is and exits, or else continues. If no, at block 194, the Manager sets checkbox State=False.

Essentially this logic performs a check on the PBX and adjunct systems to see of the user entry exists, and if it does, updates the Master Database table with the changes. If not, it leaves the tab in the same state as it was before. This synchronization uses the PBX or adjunct system as the master. It assumes these systems has the most up-to-date information and overwrites data in the Master Database.

In Global Synchronization, the user has the choice as to whether the PBX or adjunct system or the master database is the "master".

Global Synchronization feature 22 involves a record-by-record comparison of the Master Database 14 with the entries found in the PBX and adjunct systems. The user gets to decide in which direction the synchronization is to occur.

For example, the user could elect to have the Master Database 14 be the source of information to the PBX or adjunct system. Records in the Master.Database are read one-by-one, and checked for existence in these systems. If the record is found, then the properties are updated with information from the Master Database. If the record does not exist, the manager will added it to the system using the Service Provider commands.

Under no circumstance does the system delete an entry on the PBX and adjunct system during a global synchronization. This is a safeguard against the user synchronizing the PBX and adjunct system with an empty Master Database. Since these systems are typically mission critical components to a corporation, it is important to prevent a user from deleting their entire phone system with a single click.

If the user selects the PBX and adjunct system as the master, synchronization is the same except in the opposite direction.

In all cases, the user has the option of synchronizing-without-update. This provides the user with the ability to see exactly what the Manager would do to complete the synchronization. This is especially useful when the system has become greatly out-of-sync and requires synchronization in both directions.

To synchronize in both directions, the user simply runs the synchronization (without update) twice. Selecting Manager as the master on one run, and the PBX or adjunct system as the master on the second run. This will produce two synchronization reports.

With these two reports in hand, the user's task is to review record by record which changes in the Manager need to be preserved (sent to the PBX or adjunct system). The user can use the Single-Point-of-Entry controls on the User Editor to push these important records out to these systems. Once this is done, the user can safely do a global synchronization selecting one of these systems as the master. The Manager and the external system will now be synchronized. Historically, after this two-way synchronization has been performed once, the user routinely runs all future synchronizations using Manager as the master.

The PBX Switch SPE 26 is a Service Provider that allows the system to interact with a phone system. For example, in one embodiment Service Provider 26 is specifically designed for the NEC NEAX2400 HDS, NEAX2400 ICS, NEAX2400 IMX, and the IVS2000.

Each of these phone systems has their own unique requirements for data organization. To make development easier, functionality was grouped into base classes in the object model. This allowed the placement of commonly used command logic in one location. The objects that contain the command logic are:

CMatEngine—this object provides the lowest level of common command logic. All other command objects are derived from this class.

CNeax2400—this object contains command logic for the NEC NEAX2400 HDS and ICS systems.

CNeaxIMX—this object is derived from the CNeax2400 object and provides command logic for the NEAX2400 IMX system.

CNeaxRDS—this object is derived from the CNeax2400 object and provides command logic for the NEAX2400 RDS system.

CNeax2000—this object is derived from the CMatEngine object and provides command logic for the IVS2000 system.

In addition to the command logic objects, the PBX Switch SPE also contains objects that are used to provide the communication links to each phone system. The following communication objects exist:

CMatInterface—this object provides basic connection/disconnection logic. All other communication objects use this base class.

CMat2400—this object provides communication facilities to the NEAX2400 HDS and ICS systems.

CMatIMX—this object is derived from CMat2400 and provides communication facilities to the NEAX2400 IMX system.

CMat2000—this object is derived from CMatInterface and provides communication facilities to the IVS2000 system.

Object Model

Figure 8A:
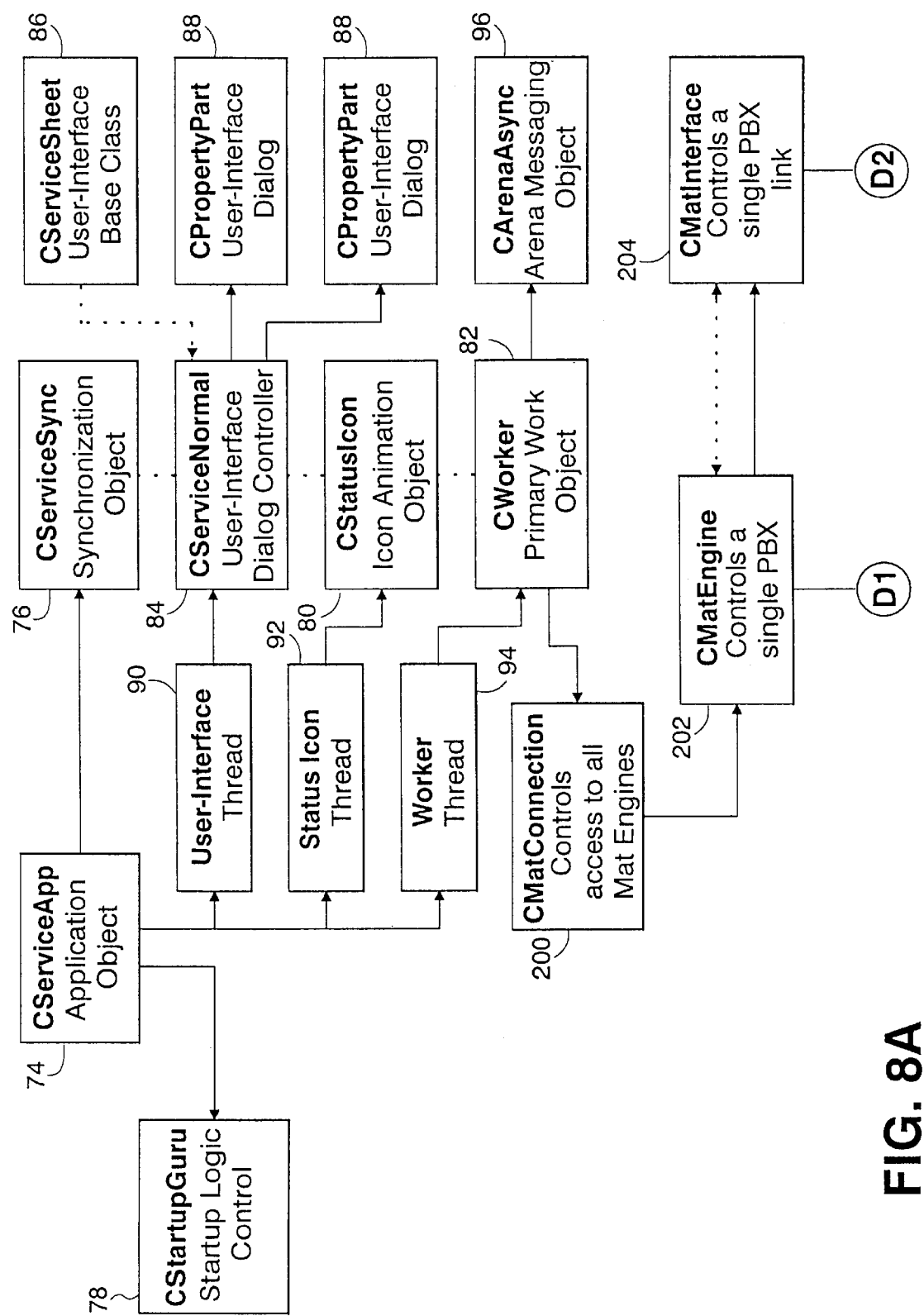
FIGS. 8A and 8B bridged by D1, D2 show a flow diagram of the object model for creating a PBX service provider.
Figure 8B:
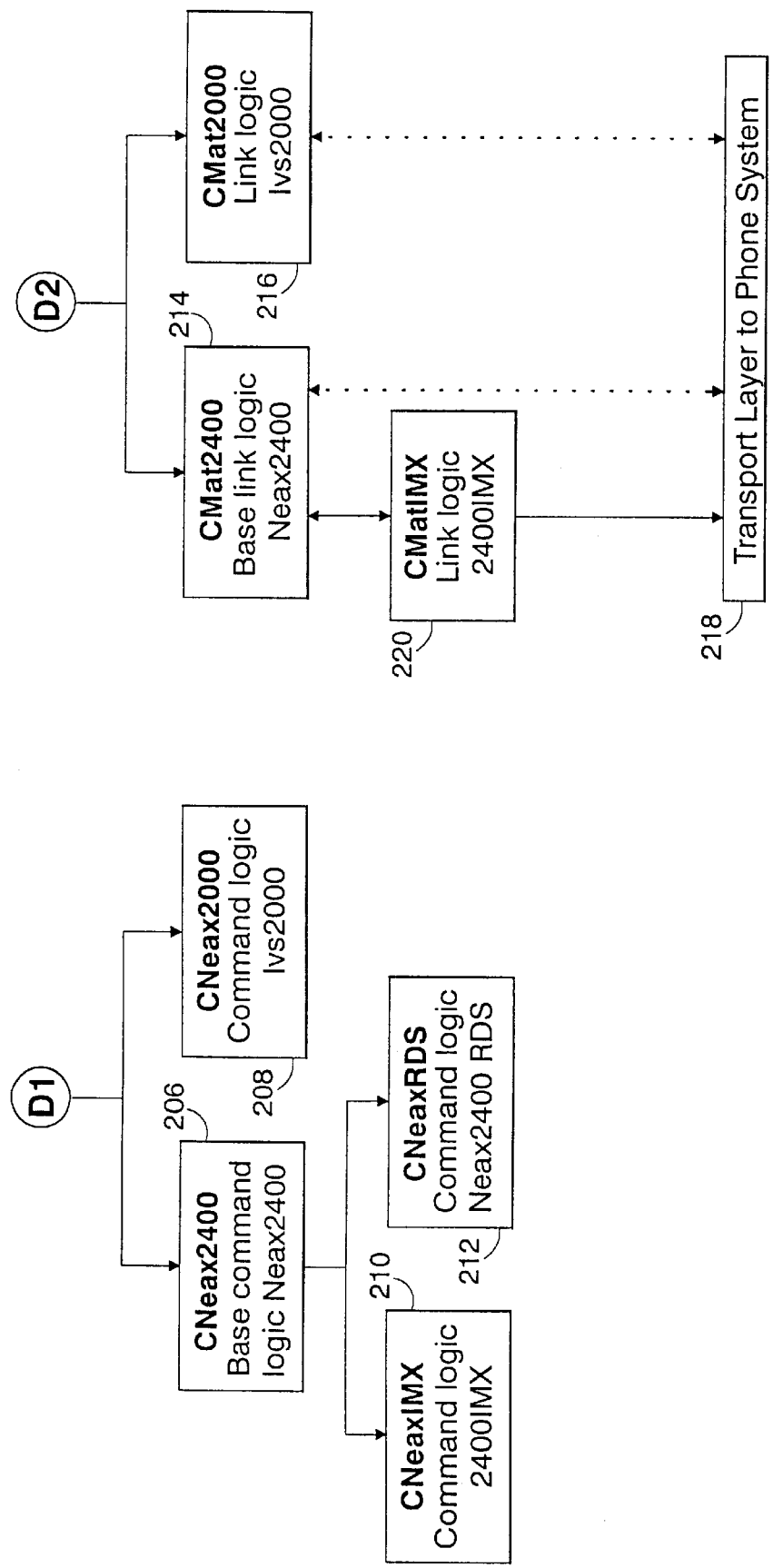

The object model can be diagramed as shown in FIGS. 8A and 8B. The objects common to FIG. 3 that are shown in FIGS. 8A and 8B will not be described again. Module CMatConnection 200 controls access to all engines and is connected to CWorker object 82. The CMat Connection object 200 controls access to multiple CMat engine objects, one for each PBX. As shown in FIGS. 8A and 8B, CMatConnection object 200 controls CMatEngine 202 for controlling a single PBX. The CMatEngine 202 causes the CMatInterface object 204 to communicate with the phone system. CMatInterface 204 controls a single PBX link. CMatEngine 202 as shown in FIG. 8 controls CNeax2400 module 206 that provides base command logic in the Neax2400. CMatEngine 202 also controls CNeax 2000 module 208 and provides command logic for Ivs2000. Base command module 206 controls CNeaxIMX module 210 and CNeaxRDS module 212. Modules 210 and 212 provide command logic for 2400IMX and 2400RDS switches. CMatInterface object 204 controls CMat2400 object 214 and CMat object 216. CMat2000 logic. 216 provides link logic for the Ivs2000 and is connected to transport layer 218 to the phone system. Similarly, CMat2400 object 214 provides base link logic to Neax2400 and also to transport layer 218. In addition, CMat2400 object 214 controls CMatIMX 220 which provides link logic for the 2400IMX which is attached to transport link 218.

Figure 9A:
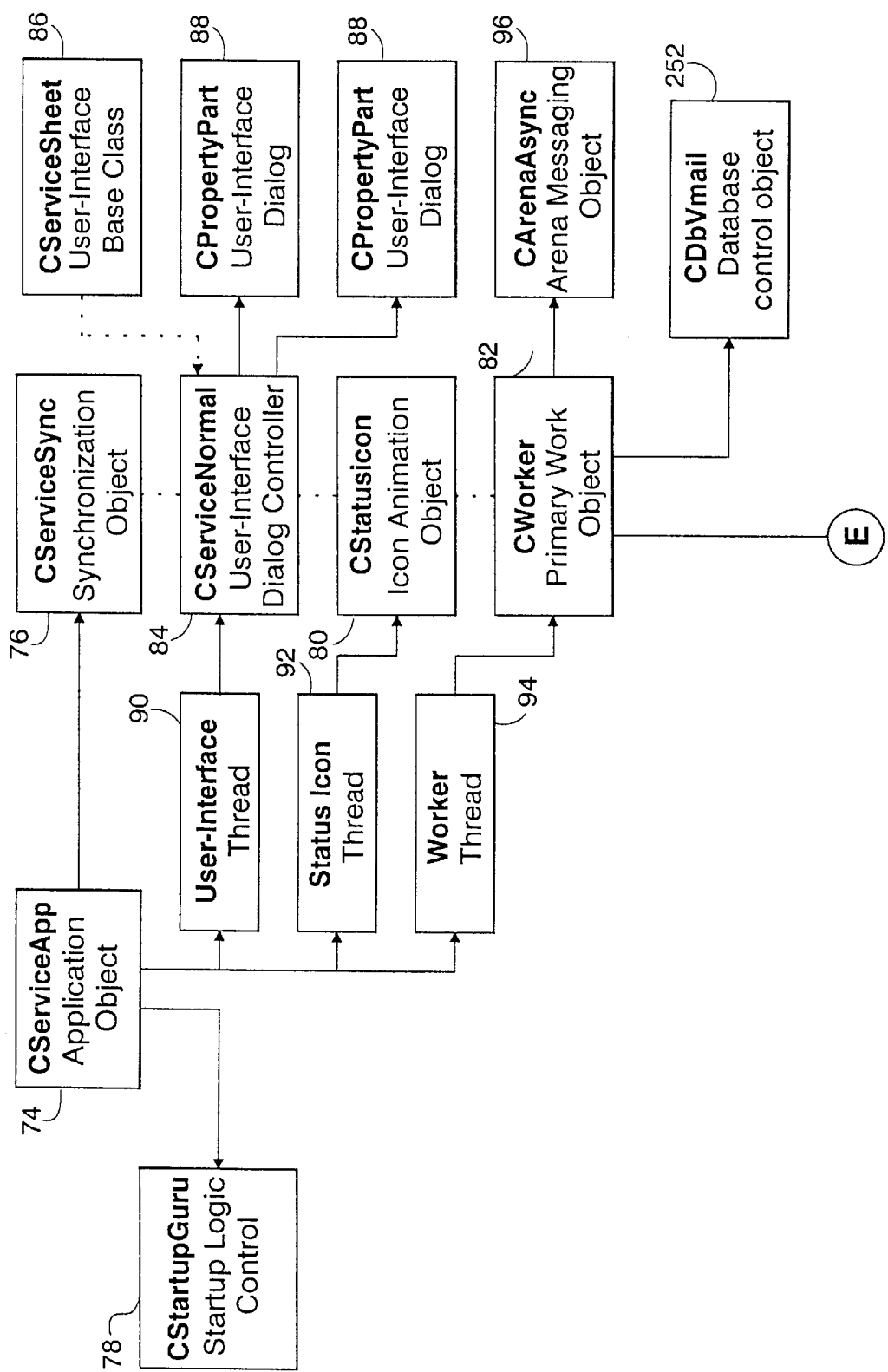
FIGS. 9A and 9B bridged by connector E show a flow-diagram of the object model for creating a voice mail service provider.
Figure 9B:
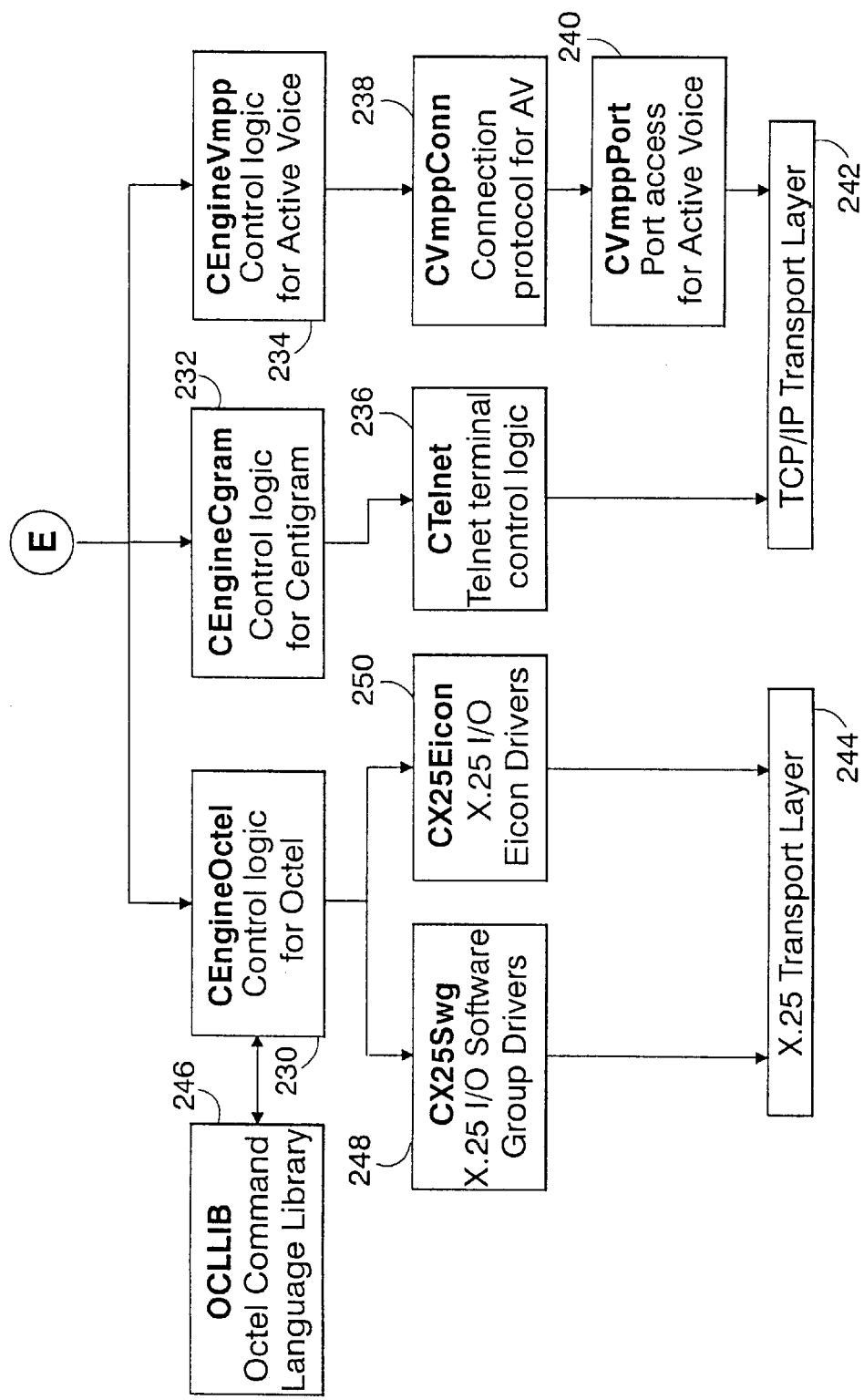

The Voice Mail SPE 28 is a Service Provider that allows the system to manage various Voice Mail Systems. Each of the systems may require different communication methods. In some cases, it may require the Voice Mail vendor to create special ports on their product. Using these ports, the telemanagement system of the present invention can affect changes to different records in the Voice Mail vendors' databases. The object model is shown in FIGS. 9A and 9B.

When the Service Provider initializes, the CWorker object 82 creates multiple voice mail engine objects (CEngineXX) 230–234 depending on the system configuration. Each engine object is responsible for controlling a specific system. CEngineA 230 contains the control logic for an Octel Voice Mail System A. CEngineB 232 contains the control logic for a Centigram Voice Mail System B. CEngineC 234 contains the control logic for an System C. For the case where the voice mail system has no existing communication ability to use, a standard Voice Mail Provisioning Protocol (VMPP) was created. This protocol is transport independent and defines an exact messaging sequence that links up with the Arena almost one for one.

CTelnet object 236 is a TELNET session handler for voice mail systems in which communication is accomplished over a TCP/IP Telnet session.

CVmppConn object 238 contains the connection/disconnection protocol logic required to support the Voice Mail Provisioning Protocol.

CVmppPort object 240 controls low level data access to a VMPP-enabled data link.

Many transports can be supported, however in practice two transports are widely used:

TCP/IP 242 is usually accomplished by connection to a particular IP Address and socket (port).

X.25 244 is usually implemented as an X.25 Permanent Virtual Circuit (PVC).

A-LIB object 246 is a library of functions that provide message encoding/decoding logic for communicating with voice mail system A. The CX25Swg object 248 provides the logic necessary to communicate with the Software Group's X.25 interface card. This card provides the physical connection to voice mail system A. This CX25Eicon object 250 provides the logic necessary to communicate with the Eicon X.25 interface card. It is used as alternate device to the Software Group's card. The CX25Swg and CX25Eicon object isolate the specific differences between the two cards from the CEngineA object 230. CDbVmail object 252 provides isolated access to the Master Database in the system. The CWorker object 82 uses this object to read/write information to/from the Master Database tables.

Figure 10:
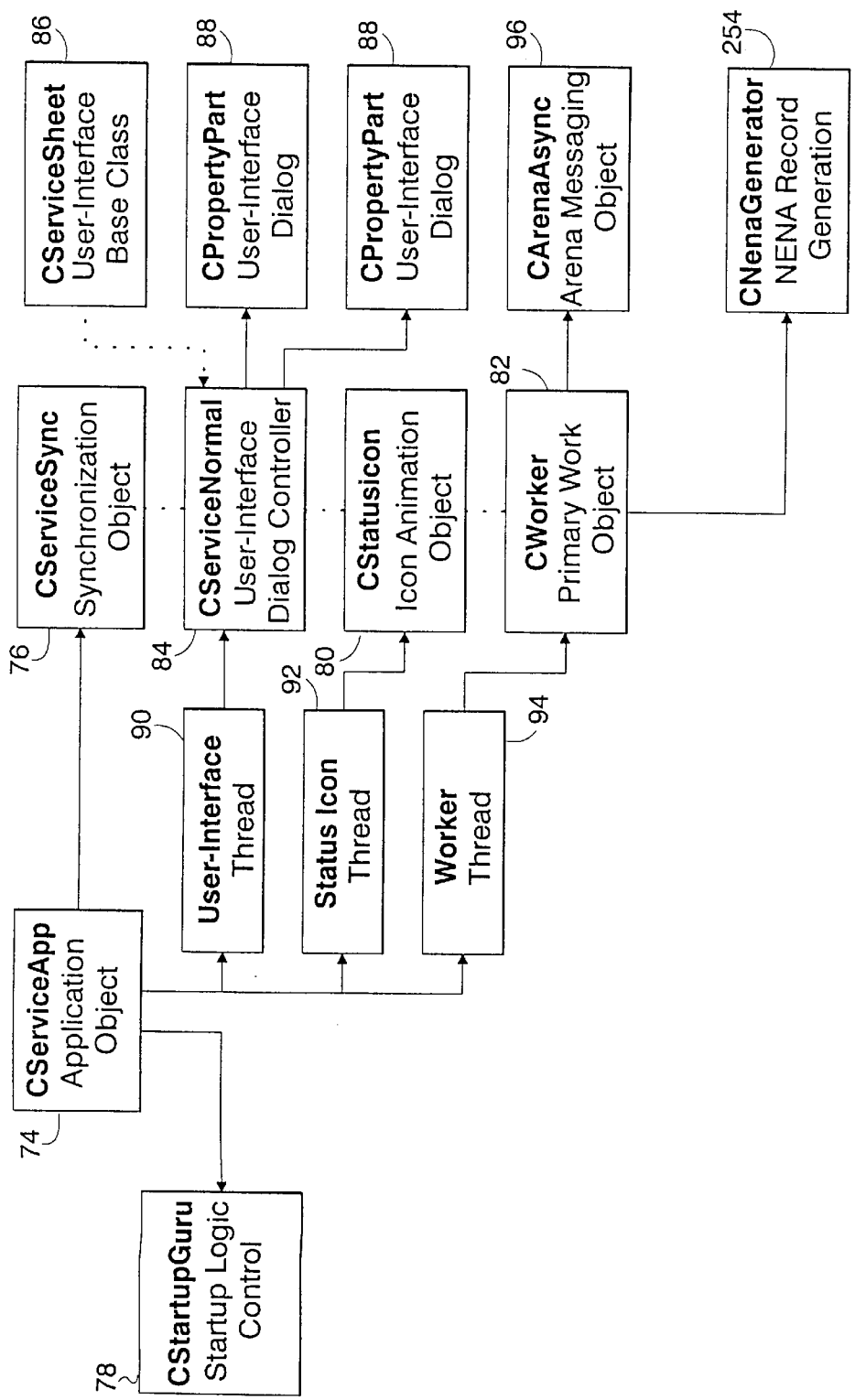
FIG. 10 is a flow diagram of the object model for creating a 911 emergency service provider.

The E911 SPE is a Service Provider that allows the system to update the National 911 Directory 50. The object module is shown in FIG. 10.

The E911 Service Provider 30 is based on the Service Provider Application Framework with the addition of a single object, the CNenaGenerator 254. This object is created by the CWorker object, and is responsible for generating NENA (National Emergency Number Association) records. These records are sent to the 911 Public Service Agency to update the National Emergency 911 Directory.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

What is claimed is:

1. A program storage device readable by a machine, tangibly embodying a program of instructions executable by the machine to perform method steps for configuring a Service Provider telemanagement program module by a client application, where the Service Provider supports multiple systems, said method steps comprising:

sending a request for Service Provider version information from the client application to a Service Provider;

sending version information back to the client application from the Service Provider indicating a multiple system support;

sending a request to identify system support from the client application to the Service Provider;

sending a list of all supported systems back to the client application from the Service Provider;

selecting a system for configuration;

sending a request for selected system version information from the client application to the selected Service Provider;

sending back system version information from the selected Service Provider to the client application;

sending a request for all supported properties for the selected system from the client application to the Service Provider;

sending back a list of all supported properties for the selected system from the Service Provider to the client application; and selecting one or more supported properties for management by the Service Provider.

* * * * *